(12) United States Patent
LaBosco et al.

(10) Patent No.: US 10,854,216 B2
(45) Date of Patent: Dec. 1, 2020

(54) ADAPTIVE BEAMFORMING MICROPHONE METADATA TRANSMISSION TO COORDINATE ACOUSTIC ECHO CANCELLATION IN AN AUDIO CONFERENCING SYSTEM

(71) Applicant: Crestron Electronics, Inc., Rockleigh, NJ (US)

(72) Inventors: Mark LaBosco, New City, NY (US); Dennis Fink, Warwick, NY (US); Mitchell Walker, Nyack, NY (US); Alex Parisi, Hartsdale, NY (US); Matthew King, Washington Township, NJ (US)

(73) Assignee: Crestron Electronics, Inc.

( * ) Notice: Subject to any disclaimer, the term of this patent is extended or adjusted under 35 U.S.C. 154(b) by 0 days.

(21) Appl. No.: 16/790,377

(22) Filed: Feb. 13, 2020

(65) Prior Publication Data
US 2020/0265859 A1 Aug. 20, 2020

Related U.S. Application Data

(60) Provisional application No. 62/806,410, filed on Feb. 15, 2019.

(51) Int. Cl.
*G10L 21/0232* (2013.01)
*H04R 1/40* (2006.01)
(Continued)

(52) U.S. Cl.
CPC ........ *G10L 21/0232* (2013.01); *H04L 65/403* (2013.01); *H04R 1/406* (2013.01);
(Continued)

(58) Field of Classification Search
CPC ....... G10L 21/0232; G10L 2021/02082; G10L 2021/02166; H04L 65/403; H04R 1/406;
(Continued)

(56) References Cited

U.S. PATENT DOCUMENTS

| | | | | |
|---|---|---|---|---|
| 5,323,459 A * | 6/1994 | Hirano | .................. | H04M 9/082 370/290 |
| 6,836,243 B2 * | 12/2004 | Kajala | ..................... | G01S 3/043 342/372 |

(Continued)

*Primary Examiner* — Xu Mei
(74) *Attorney, Agent, or Firm* — Crestron Electronics, Inc.

(57) ABSTRACT

An audio processing device for use in a network connected audio conferencing system is provided, comprising: a network microphone array comprising two or more microphones (mics) and a beamforming circuit, wherein the network mic array is adapted to acquire acoustic audio signals, convert the same to electric audio signals, perform audio beamforming on the electric audio signals, and output a digital combined beamforming circuit output signal that comprises a first signal part and a second signal part, and wherein the first signal part comprises a first set of digital bits that comprises an active beam index, and wherein the active beam index encodes a selected beam position out of a possible N beam positions, and wherein the second signal part comprises a second set of digital bits that comprises a beamformed audio signal; a receiver adapted to receive the digital combined beamforming circuit output signal and split the same into the first signal part and the second signal part; a plurality of acoustic echo cancellation filter devices, each of which are adapted to receive the second signal part and a far end reference audio signal from a far end audio processing device, and perform acoustic echo cancellation on the beamformed audio signal in view of the far end audio signal; and an AEC filter circuit controller adapted to receive the first signal part, decipher the active beam index encoded in the first beamformed audio signal part to determine which of (Continued)

the N beam positions is active, and select a corresponding one of the plurality of acoustic echo cancellation filter devices based on the active one of N beam positions to generate an output audio signal from the audio processing device to be transmitted to the far end audio processing device.

6 Claims, 12 Drawing Sheets

(51) Int. Cl.
    *H04L 29/06*         (2006.01)
    *H04R 3/00*          (2006.01)
    *G10L 21/0216*     (2013.01)
    *G10L 21/0208*     (2013.01)
    *H04M 9/08*        (2006.01)

(52) U.S. Cl.
    CPC .... H04R 3/005 (2013.01); *G10L 2021/02082* (2013.01); *G10L 2021/02166* (2013.01); *H04M 9/08* (2013.01)

(58) Field of Classification Search
    CPC ........ H04R 3/005; H04M 9/08; H04M 9/082; H04M 9/085; H04M 9/087; H04M 3/56; H04M 3/567; H04M 3/568; H04M 2203/50; G10K 11/34; G10K 11/341; G10K 11/343; H04B 3/20; H04B 3/21; H04B 3/23
    USPC ....... 381/66, 91, 92, 122; 379/406.1–406.16, 379/202.01; 367/137, 138; 370/286, 370/289, 290
    See application file for complete search history.

(56) References Cited

U.S. PATENT DOCUMENTS

| | | | | |
|---|---|---|---|---|
| 8,213,596 | B2* | 7/2012 | Beaucoup | H04M 9/082 379/406.08 |
| 8,498,423 | B2* | 7/2013 | Thaden | H04M 9/082 381/66 |
| 8,824,693 | B2* | 9/2014 | Åhgren | H04R 3/02 381/58 |
| 9,042,567 | B2* | 5/2015 | Huang | H04M 9/082 381/66 |
| 9,659,576 | B1* | 5/2017 | Kotvis | G10L 21/0224 |
| 9,842,606 | B2* | 12/2017 | Ushakov | G10L 21/0208 |
| 10,229,667 | B2* | 3/2019 | Marquez | H04R 3/005 |
| 10,746,840 | B1* | 8/2020 | Barton | G01S 3/8083 |
| 2002/0041679 | A1* | 4/2002 | Beaucoup | H04M 9/08 379/406.01 |
| 2008/0259731 | A1* | 10/2008 | Happonen | H04R 3/005 367/121 |
| 2015/0341734 | A1* | 11/2015 | Sherman | H04R 1/406 381/92 |

* cited by examiner

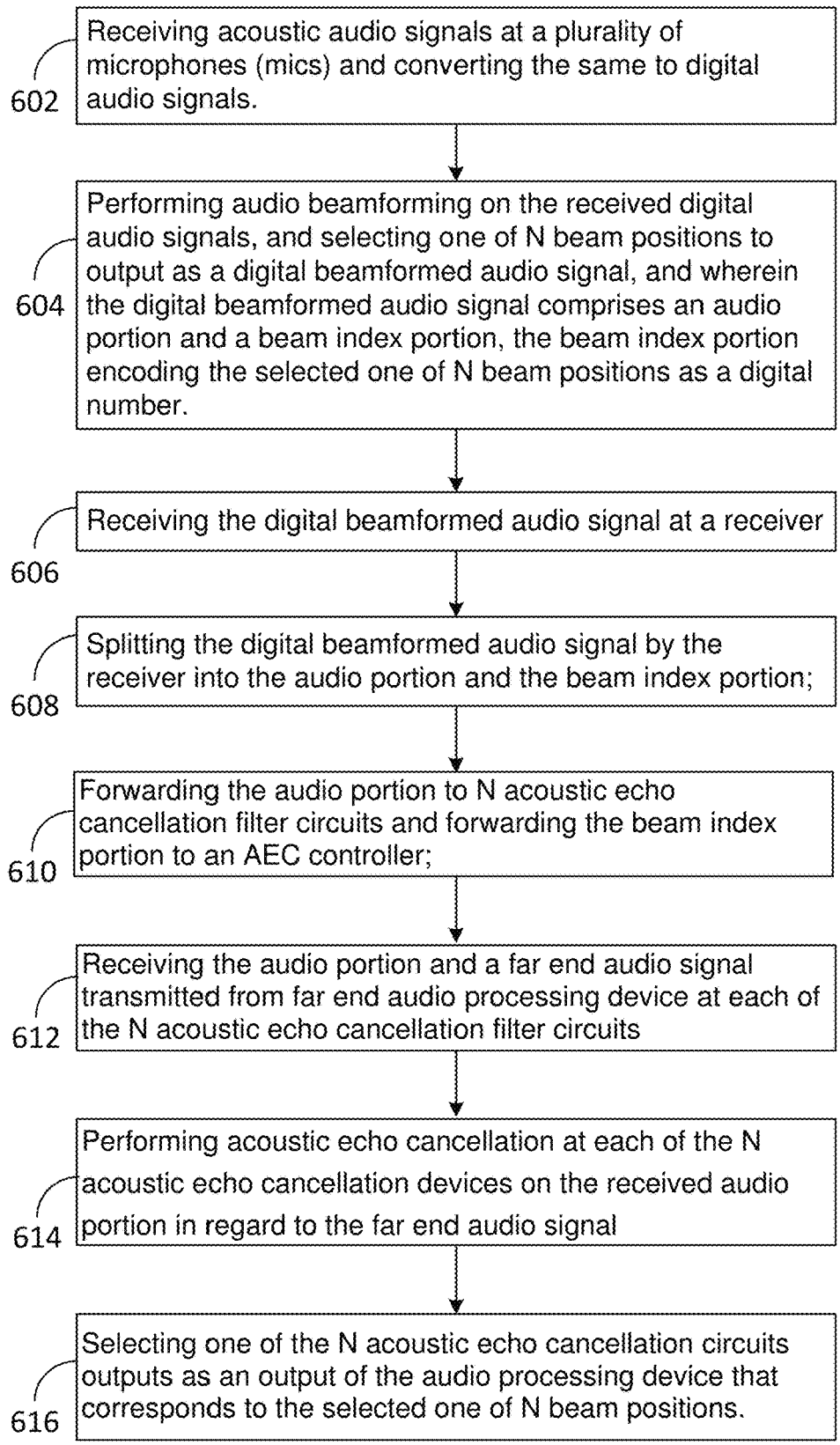

702
1. Rejecting a beam radius to avoid the far end (FE) Loudspeaker;
2. Determining a direction of a speaker during operation by detecting FE single talk; and
3. Identifying the loudest beam signal (Alternatively: Entering the location (azimuth) of a speaker manually during setup and commissioning)

704
Varying the convergence rate of the AEC and speeding up the convergence rate if the beamformer switches to an angle that has not been used recently thus allowing for faster adaptation on a path change.

706
Increasing the amount of NLP attenuation can occur during initial convergence after a beam change to mask the adaptation artifacts.

708
Delaying the inputs to the AEC but not the beam index or doubletalk and single talk detectors, such that adaptation or selection of another AEC can start earlier than the need to apply it. The AEC will already be converged when the beam signal is then applied.

710
Initializing the AEC with a 'seed impulse response', such as a single coefficient at the direct echo path time that will increase the speed at which the AEC's adaptive filter can converge. This can be manually set at room setup or calculated at run time using autocorrelation techniques.

712
Moving a separate 'training beam' around during run time to create the library of AEC coefficients for each beam angle. This training beam can also be used to characterize the ambient noise in each direction and to create an array of frequency domain functions for spectral subtraction noise reduction for each angle.

FIG. 7

| Index Value (Binary) | Beam Position |
|---|---|
| 0000 | 1 |
| 0001 | 2 |
| 0010 | 3 |
| 0011 | 4 |
| 0100 | 5 |
| 0101 | 6 |
| 0110 | 7 |
| 0111 | 8 |
| 1000 | 9 |
| 1001 | 10 |
| 1010 | 11 |
| 1011 | 12 |
| 1100 | 13 |
| 1101 | 14 |
| 1110 | 15 |
| 1111 | 16 |

FIG. 8

ADAPTIVE BEAMFORMING MICROPHONE METADATA TRANSMISSION TO COORDINATE ACOUSTIC ECHO CANCELLATION IN AN AUDIO CONFERENCING SYSTEM

PRIORITY INFORMATION

The present application claims priority under 35 U.S.C. § 119(e) to U.S. Provisional Patent Application Ser. No. 62/806,410, filed Feb. 15, 2019, the entire contents of which are expressly incorporated herein by reference.

BACKGROUND

Technical Field

Aspects of the embodiments relate to audio conferencing systems, and more specifically to systems, methods, and modes for implementing an acoustic echo cancellation device with adaptive beamforming microphones (mic) in a conferencing system wherein beamforming beam position metadata can be shared with, in a first aspect, the acoustic echo cancellation (AEC) filter processor and mixer controls, and in a second aspect, the beamforming beam position metadata can be shared with the AEC, and wherein in both cases, such sharing of beamforming beam position metadata improves the performance of AEC processing.

Background Art

AEC and beamforming mics are typically used in audio-video or audio-only conferencing systems. These conferencing systems are employed by numerous entities in conference rooms, such entities including businesses, governments, schools, sports teams, and many others. The conferencing systems can include an audio-only interface, or a video and audio interface. It is possible to use a video-audio device with a remote (or "far end") location that uses only an audio-only device. Regardless, one or both of the near end and far end conferencing systems can employ sound bars that include multiple mic audio pick-up systems, and one or more speakers to hear the far end audio. Some of these conferencing systems can employ beamforming mic systems, wherein one or more sophisticated electronic devices can generate an audio "beam" (really a directional antenna (mic) receive pattern) that can track a speaker in the room the conferencing system is being used in. Such beamforming techniques improves the audio quality by isolating the audio to just the speaker (in an idealized system) so that other noise is not picked up by the mics. In addition, it is known to employ AEC in conferencing systems to substantially eliminate/reduce echoes in the conversation, which can be highly annoying. Using an AEC after an adaptive beamforming mic in a conferencing system can result in poor echo performance. The beam moves faster than the AEC can adapt. Solutions today employ excessive echo reduction, which results in more of a half-duplex conversation. The more conventional and typically used approach, therefore, is to position echo cancellers before the beam-former. Positioning the echo cancellers before the beam-former is computationally intensive since an AEC is required for each mic element.

Ceiling mounted mics in audio conferencing applications are less than ideal because the distance between the mic and people results in low signal-to-noise (SNR). Room reverb, heating voltage and air conditioning systems (HVAC) and other noise sources are picked up by the mics and results in reduced voice intelligibility. There is a trend in the industry to use multiple mics and beamforming algorithms using DSPs. The outputs of these mics are trending towards digital over networks using protocols like Dante and AES67.

The use of multiple mics in a beamforming array can improve the situation by focusing the mic beam to an area close to the person speaking and rejecting the sound produced outside the beam. There are two types of beamforming mic arrays commonly used—fixed and dynamic beamforming. A multi-output fixed beam array such as the Shure MXA-910 can be configured to locate 8 different pickup areas each sent as a separate signal. The 8 signals from the mic can be transmitted over a network using Dante to a DSP device such as Crestron's DSP-1283. Each mic signal would go through a separate AEC filter and then a mixer can be used to combine the multiple beams into fewer signals to send as a near end signal during audio conferencing.

The Sennheiser Team Connect 2 uses 28 mic elements and processing to dynamically steer a single beam to the position of the desired voice signal. This mic array only outputs a single signal. If this signal is sent to a DSP for acoustic echo cancellation, it may not result in adequate echo reduction because the beam former adapts faster than the acoustic AEC algorithm. The echo path changes drastically for each beam position, so the AEC has to readapt to the new position in a finite amount of time. During the adaption echo can be heard unless non-linear processing (NLP) attenuates it. During single talk NLP attenuation can provide adequate suppression, but during double talk excessive NLP results in attenuation of one talker resulting in a half-duplex behavior.

AEC is necessary for audio conferencing. Acoustic echo is caused by the mics picking up the direct or reverberant sound from the speakers in the far end room. People cannot communicate effectively if they hear a delayed version of their words coming back at them during a phone call. AEC eliminates this echo. Beamforming is a method to improve the SNR of a mic by combining a multitude of mic elements using DSPs in a manner that points the beam in a particular direction. This reduces picked up noise, room reverberation and some amount of echo. The size of the array and the number of mics determines the pickup pattern versus frequency. To eliminate lower frequencies, the array needs many mics spaced over a significant distance. The fundamental frequencies of voice spans a range of about 100 Hertz (Hz) to a few kilohertz (KHz). Echoes in the low frequency range are difficult to attenuate with beamforming so a beamforming algorithm needs to be applied to produce a satisfactory full duplex audio/video conference. Mic arrays can be one dimensional for wall mount applications or two dimensional for ceiling mount applications.

There are different ways to combine beamforming and AEC. One way is to AEC each mic element prior to the beamforming algorithm. This requires a significant amount of DSP processing for a large number of mics in the array. It also requires that a reference is available in mic array for the AEC to cancel. This would require sending a signal to the mic array. Another approach is to perform the AEC after the beamforming. For fixed beamforming, you need an AEC calculation for each beam signal. Since the beams are fixed, each AEC can adapt to the echo path each beam contains and the paths are relatively static.

For dynamic beamforming, putting the AEC after the beamforming is problematic. The beam changes direction based on the location of the sound source. You can improve the echo problem by configuring the beam former not to adapt to the loudspeaker playing the far end voice, but the echo path will change every time the beam direction changes.

An AEC can be configured to adapt quickly, but that can result in an unstable echo filter. If the AEC has knowledge of when the beam changes, it can change adaption rates on the fly—fast on change, slow when beam is fixed. This is a compromise and residual echo will likely be present under situations such as double talk while multiple people are talking on one side.

Accordingly, a need has arisen for systems, methods, and modes for implementing an acoustic echo cancellation device with adaptive beamforming microphones (mic) in a conferencing system wherein beamforming beam position metadata can be shared with, in a first aspect, the acoustic echo cancellation (AEC) filter processor and mixer controls, and in a second aspect, the beamforming beam position metadata can be shared with the AEC, and wherein in both cases, such sharing of beamforming beam position metadata improves the performance of AEC processing. According to aspects of the embodiments, the mixer can be used to eliminate AEC filter change artifacts. According to further aspects of the embodiments, AEC filter change artifacts can be eliminated by slewing the AEC adaptive filters over time.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for implementing an acoustic echo cancellation device with adaptive beamforming microphones (mic) in a conferencing system wherein beamforming beam position metadata can be shared with, in a first aspect, the acoustic echo cancellation (AEC) filter processor and mixer controls, and in a second aspect, the beamforming beam position metadata can be shared with the AEC, and wherein in both cases, such sharing of beamforming beam position metadata improves the performance of AEC processing. According to aspects of the embodiments, the mixer can be used to eliminate AEC filter change artifacts. According to further aspects of the embodiments, AEC filter change artifacts can be eliminated or substantially eliminated by slewing the AEC adaptive filters over time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, an audio processing device for use in a network connected audio conferencing system is provided, comprising: a network microphone array comprising two or more microphones (mics) and a beamforming circuit, wherein the network mic array is adapted to acquire acoustic audio signals, convert the same to electric audio signals, perform audio beamforming on the electric audio signals, and output a digital combined beamforming circuit output signal that comprises a first signal part and a second signal part, and wherein the first signal part comprises a first set of digital bits that comprises an active beam index, and wherein the active beam index encodes a selected beam position out of a possible N beam positions, and wherein the second signal part comprises a second set of digital bits that comprises a beamformed audio signal; a receiver adapted to receive the digital combined beamforming circuit output signal and split the same into the first signal part and the second signal part; a plurality of acoustic echo cancellation filter devices, each of which are adapted to receive the second signal part and a far end reference audio signal from a far end audio processing device, and perform acoustic echo cancellation on the beamformed audio signal in view of the far end audio signal; and an AEC filter circuit controller adapted to receive the first signal part, decipher the active beam index encoded in the first beamformed audio signal part to determine which of the N beam positions is active, and select a corresponding one of the plurality of acoustic echo cancellation filter devices based on the active one of N beam positions to generate an output audio signal from the audio processing device to be transmitted to the far end audio processing device.

According to the first aspect of the embodiments, the audio processing device further comprises: a mixer adapted to receive each of the outputs of the plurality of acoustic echo cancellation filter devices, output the output of the selected acoustic echo cancellation filter device to be transmitted to the far end audio processing device, and wherein the mixer is further adapted to transition its output from the output of a previously selected acoustic echo cancellation filter device to an output of a newly selected acoustic echo cancellation filter device to be output from the audio processing device to the far end audio processing device.

According to the first aspect of the embodiments, the mixer is adapted to receive the first signal part, decipher the active beam index encoded in the first signal part to determine which of the N beam positions is active, and select the newly selected acoustic echo cancellation filter device that corresponds to the active one of N beam positions.

According to a second aspect of the embodiments, a method for processing audio signals in an audio processing device is provided, the method comprising: receiving acoustic audio signals at a plurality of microphones (mics) and converting the same to digital audio signals; performing audio beamforming on the received digital audio signals, and selecting one of N beam positions to output as a digital beamformed audio signal, and wherein the digital beamformed audio signal comprises an audio portion and a beam index portion, the beam index portion encoding the selected one of N beam positions as a digital number; receiving the digital beamformed audio signal at a receiver; splitting the digital beamformed audio signal by the receiver into the audio portion and the beam index portion; forwarding the audio portion to N acoustic echo cancellation filter circuits and forwarding the beam index portion to an AEC controller; receiving the audio portion and a far end audio signal transmitted from far end audio processing device at each of the N acoustic echo cancellation filter circuits; performing acoustic echo cancellation at each of the N acoustic echo cancellation devices on the received audio portion in regard to the far end audio signal; and selecting one of the N acoustic echo cancellation circuits outputs as an output of the audio processing device that corresponds to the selected one of N beam positions.

According to the second aspect of the embodiments, the method further comprises: receiving each of the outputs of the plurality of acoustic echo cancellation filter devices at a mixer; outputting, by the mixer, the output of the selected acoustic echo cancellation filter device to be transmitted to the far end audio processing device; transitioning, by the mixer, its output from the output of a previously selected acoustic echo cancellation filter device to an output of a newly selected acoustic echo cancellation filter device to be output from the audio processing device to the far end audio processing device.

According to the second aspect of the embodiments, the method further comprises: receiving at the mixer the beam index portion and deciphering the beam index to determine which of the N beam positions is active; and selecting the newly selected acoustic echo cancellation filter device that corresponds to the active one of N beam positions.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

FIG. 6 illustrates a flow chart of a method for performing adaptive bearmforming using beamforming metadata to coordinate an acoustic echo cancellation process according to aspects of the embodiments.

FIG. 7 illustrates additional processing steps that can be performed to improve adaptive bearmforming using beamforming metadata to coordinate an acoustic echo cancellation process according to aspects of the embodiments.

FIG. 8 illustrates a table of a beam index representing encoded beam position information versus a beam position according to aspects of the embodiments.

DETAILED DESCRIPTION

Figure 1:
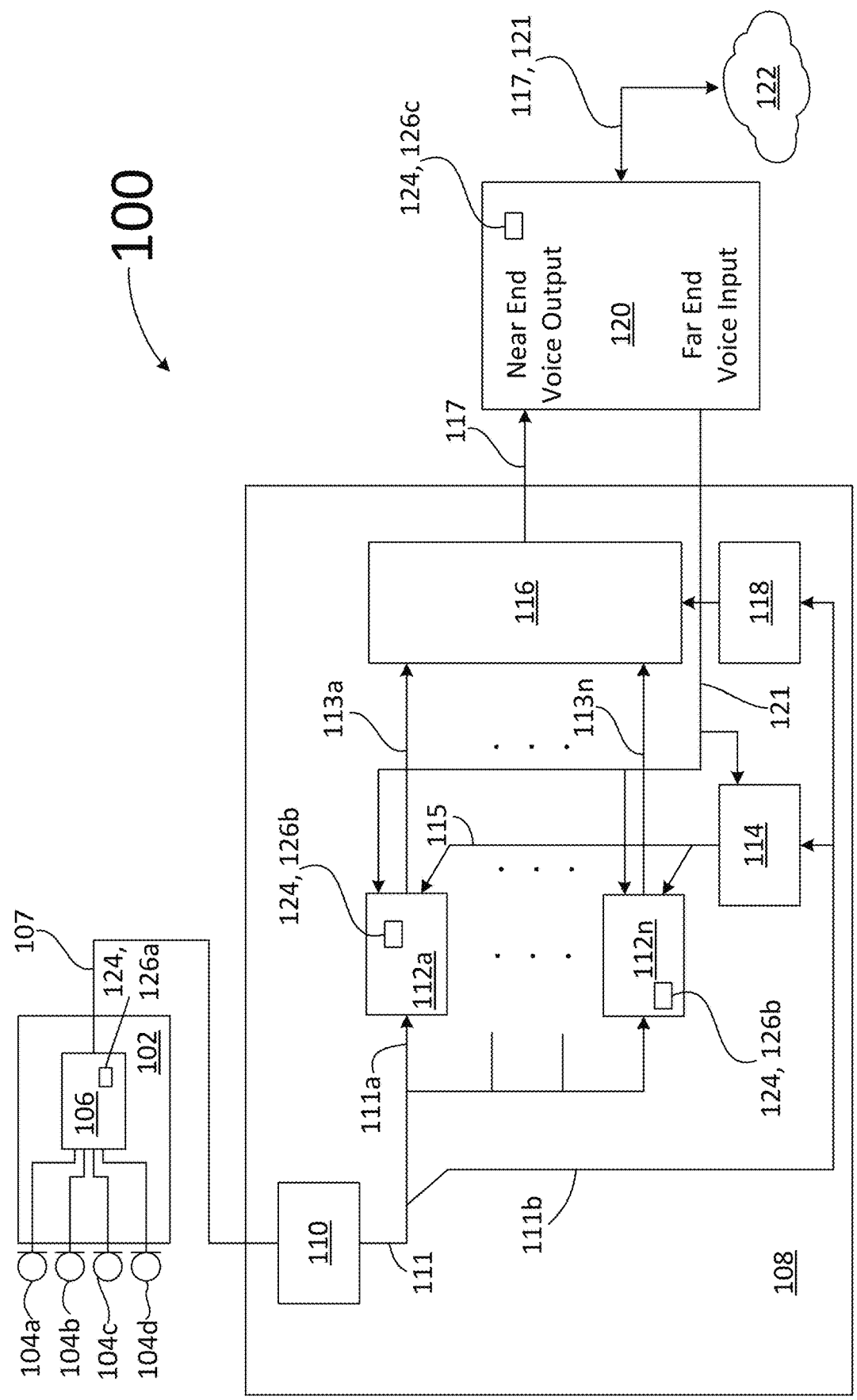
FIG. 1 illustrates a block diagram of an audio processing device that employs adaptive beamforming using beamforming metadata for use in acoustic echo cancellation according to aspects of the embodiments.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as audio systems and devices, audio-networking devices, and mechanical systems related to audio systems and devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

List of Reference Numbers for the Elements in the Drawings in Numerical Order The following is a list of the major elements in the drawings in numerical order.
100 Audio Processing Device (APD)
102 Network Mic Array
104 Microphone (Mic)
106 Adaptive Beamformer
107 Combined Audio and Beam Position Data Signal
108 Network Audio Digital Signal Processor (NA-DSP)
110 Dante Receiver
111 Digital Audio Output Word
111a 20 Most Significant Bits (MSBs)
111b 4 Least Significant Bits (LSBs)
112 Acoustic Echo Cancellation (AEC) Filter Circuit
113 AEC Output
114 AEC Controller
116 Mixer/Selector (Mixer)
117 Near End Voice Signal
118 Mixer Controller
120 Audio Conference Computer 121 Far End Voice Signal
122 Network
124 Processor
126 Software Module/Application/Program (App)
200 Beamforming Circuit with A Single Output
202 Selector Output Logic Circuitry (Control Logic)
204 AEC Reference Signal
206 Beam Index Signal
300 Beamforming Circuit with Multiple Outputs
400 Beamforming Circuit with a Single Acoustic Echo Cancellation Device and Coefficient Library
402 Beamformer Aperture Control Filters
404 Beamformer Delay Elements
406 Beamformer Control Logic
408 Beamformer Selector
410 AEC Summation Circuit
412 AEC Finite Impulse Response (FIR) Filter
414 AEC FIR Filter Coefficients
500 Smoothly Switching AEC Filter Coefficients Circuit (AEC Circuit)
502 Fixed FIR Filter
504 Adaptive FIR Filter
506 Panning Circuit
600 Method for Performing Adaptive Bearmforming Using Mic Metadata to Coordinate an Acoustic Echo Cancellation Process
602-616 Method Steps for Method 600
702-716 Alternative Beamforming and Acoustic Echo Cancellation Processing Steps
902 Conference Table
904 Conference Room
906 Audio Beam Pickup Pattern
1101 Shell/Box
1102 Integrated Display/Touch-Screen (Display)
1104 Internal Data/Command Bus (Bus)
1106 Processor Internal Memory
1110 Universal Serial Bus (USB) Port
1111 Ethernet Port
1112 Compact Disk (CD)/Digital Video Disk (DVD) Read/Write (RW) (CD/DVD/RW) Drive
1114 Floppy Diskette Drive
1116 Hard Disk Drive (HDD)
1118 Read-Only Memory (ROM)
1120 Random Access Memory (RAM)
1122 Video Graphics Array (VGA) Port or High Definition Multimedia Interface (HDMI)
1123 HDMI Cable
1124 External Memory Storage Device
1126 External Display/Touch-Screen (External Display)
1128 Keyboard
1130 Mouse
1132 Processor Board/PC Internal Memory (Internal Memory)
1134 Flash Drive Memory
1136 CD/DVD Diskettes
1138 Floppy Diskettes
1142 Wi-Fi Transceiver
1144 BlueTooth (BT) Transceiver
1146 Near Field Communications (NFC) Transceiver
1148 Third Generation (3G), Fourth Generation (4G), Long Term Evolution (LTE) (3G/4G/LTE) Transceiver
1150 Communications Satellite/Global Positioning System (Satellite) Transceiver Device
1152 Antenna
1156 Universal Serial Bus (USB) Cable
1158 Ethernet Cable (CAT5)
1160 Scanner/Printer/Fax Machine
1200 Network System
1202 Mobile Device
1204 Personal Computer (PC)
1206 Internet Service Provider (ISP)
1208 Modulator/Demodulator (modem)
1210 Wireless Router (WiFi)
1212 Plain Old Telephone Service (POTS) Provider
1214 Cellular Service Provider
1218 Communications Satellite
1220 Cellular Tower
1224 GPS Station
1226 Satellite Communication Systems Control Stations
1228 Global Positioning System (GPS) Satellite
List of Acronyms Used in the Specification in Alphabetical Order The following is a list of the acronyms used in the specification in alphabetical order.
3G Third Generation
4G Fourth Generation
AEC Acoustic Echo Cancellation
AECD Acoustic Echo Cancellation Device
App Application
ARM Advanced Reduced Instruction Set Computer Machines
ASIC Application Specific Integrated Circuitry
BIOS Basic Input/Output System
BT BlueTooth
CD Compact Disk
CRC Cyclic Redundancy Check
CRT Cathode Ray Tubes
DSP Digital Signal Processor
DVD Digital Video/Versatile Disk
EEPROM Electrically Erasable Programmable Read Only Memory
FE Far End
FEC Forward Error Correction
FPGA Field Programmable Gate Array Structures
GAN Global Area Network
GPS Global Positioning System
HDD Hard Disk Drive
HDMI High Definition Multimedia Interface
HVAC Heating Ventilation and Air Conditioning
Hz Hertz
I2S Inter-Integrated Circuit Sound
IP Internet Protocol
ISP Internet Service Provider
KHz Kilo-Hertz
LCD Liquid Crystal Display
LED Light Emitting Diode Display
LSB Least Significant Bit
LTE Long Term Evolution
Mic Microphone
MIPS Mega Instructions-Per-Second
MODEM Modulator-Demodulator
MSB Most Significant Bit
Msec Millisecond
NFC Near Field Communication
NLP Non-linear Processing
PC Personal Computer
POTS Plain Old Telephone Service
PTP Precision Time Protocol
RAM Random Access Memory
RISC Reduced Instruction Set Computer
ROM Read Only Memory
RW Read/Write
SIMD Single Instructor Multiple Data
SNR Signal-to-Noise Ratio
TDM Time Division Multiplexing USB Universal Serial Bus
UVPROM Ultra-violet Erasable Programmable Read Only Memory
VGA Video Graphics Array The different aspects of the embodiments described herein pertain to the context of systems, methods, and modes for implementing an acoustic echo cancellation device with adaptive beamforming microphones (mic) in a conferencing system wherein beamforming beam position metadata can be shared with, in a first aspect, the acoustic echo cancellation (AEC) filter processor and mixer controls, and in a second aspect, the beamforming beam position metadata can be shared with the AEC, and wherein in both cases, such sharing of beamforming beam position metadata improves the performance of AEC processing, but is not limited thereto, except as may be set forth expressly in the appended claims.

For 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, conferencing, computer, and environmental systems. In addition, the devices and systems offered by Crestron streamlines technology, improving the quality of life for people who work and live in commercial buildings, universities, hotels, hospitals, and homes, among other locations. Accordingly, the systems, methods, and modes of the aspects of the embodiments described herein, as further embodied in the attached drawings, can be manufactured by Crestron Electronics Inc., located in Rockleigh, N.J., and will be marketed and sold.

Aspects of the embodiments are directed towards systems, methods, and modes for implementing an acoustic echo cancellation device with adaptive beamforming microphones (mic) in a conferencing system wherein beamforming beam position metadata can be shared with, in a first aspect, the acoustic echo cancellation (AEC) filter processor and mixer controls, and in a second aspect, the beamforming beam position metadata can be shared with the AEC, and wherein in both cases, such sharing of beamforming beam position metadata improves the performance of AEC processing. According to aspects of the embodiments, the mixer can be used to eliminate or substantially eliminate AEC filter change artifacts. According to further aspects of the embodiments, AEC filter change artifacts can be eliminated by slewing the AEC adaptive filters over time.

According to aspects of the embodiments, a method for overcoming the problems of the prior art include having a fixed number of beam positions and calculating a different AEC filter set for each beam position; that is, each beam position has a corresponding and unique AEC device associated with it, and each AEC device has a unique set of AEC filter coefficient set.

According to aspects of the embodiments, another method for overcoming the problems of the prior art includes having more beam positions than AEC filter sets and using the filters from the closest beam position previously calculated. As those of skill in the art can appreciate, people do not usually move around that often during teleconferences and therefore using a limited set of AEC filters works because the beam positions tend to focus on where the people are sitting.

According to further aspects of the embodiments, if the beamformer mic array is a separate device from the DSP that is performing the AEC, the mic array beamforming positioning (e.g., beam position information) is not communicated between the two devices. It would be beneficial if the beam position information could be shared between the two devices so the DSP can use the beam position information to improve the AEC performance. One way to do this is provide a separate communication channel for the beam position information, or beamforming metadata (or more simply, "metadata"). According to further aspects of the embodiments, the metadata can be encoded in the form of an beam index; meaning that the index comprises a fixed number of values, each of which corresponds to a known beam position formed by the beamforming device; this is discussed in greater detail below. The separate communicating channel can be a separate physical interface. For example, the beam formed audio signal can be sent over an analog XLR cable while the beam position information, regardless of form, can be sent or transmitted digitally using an RS232 cable or a network cable (such as a CAT5 Ethernet cable).

Currently available teleconferencing systems that include beamforming and AEC devices tend to use networks, including internet protocol-based networks, for audio transmission. As such, audio data can be transmitted using a Dante or AES67 interface and another network protocol can be used for the beam position information. As described in greater detail below, such beam position information can be encoded as a beam index.

As referenced above, a refinement to transmitting the audio and beam position information separately is to encode the beamforming information (metadata) into the audio data stream. This would allow it to pass along with the audio and does not require an additional channel. The benefits of this include the following:

(1) Uses off the shelf Dante or AES67 hardware and firmware.

(2) The metadata can interface between standard Dante/AES67 chipsets and the DSP over the inter-integrated circuit sound/time division multiplexing (I2S/TDM) interface already used for audio. No additional communication interface is required.

(3) The metadata can be synchronized with the associated audio using the same precision time protocol (PTP) clocking techniques that guarantees and minimizes both the audio latency and jitter.

(4) Existing discovery and routing packages for Dante or AES67 tools are not aware of other metadata channels, so keeping them combined ensures the metadata always follows the appropriate audio stream.

(5) Multicasting the mic signal (i.e., the audio beam signal) and metadata is easier since only a single multicast stream is necessary.

As those of skill in the art can appreciate, an audio beam can be generated by audio beamforming circuitry and which is described in greater detail below in regard to FIG. 1. The audio beam is, in essence, an audio signal generated by two or more mics based on a "pickup pattern" that is formed by weighting the signal outputs of two or more mics. An audio beam is therefore substantially similar to an antenna's sensitivity or radiation pattern. In the case of mics, however, the mics do not transmit acoustical energy, so their sensitivity pattern is a "receive only" pattern. While an individual mic can and does have a receive sensitivity pattern, an audio beamformer can apply weighting factors to the outputs of two or more such mics so that it can create defined sensitivity patterns that can be steered or pointed in a particular direction depending on which speaker or audio source that the beamformer wants to emphasize. Thus, the output of an audio beamformer is an audio signal that is a weighted combination of the acoustic audio signals that are picked up or acquired by the transducers in two more mics.

According to aspects of the embodiments, there are various methods of encoding the metadata (e.g., the beamposition information of beam index) into an audio stream. One method is to use an extra audio channel in the audio flow (e.g., when using a Dante or AES 67 capable mic) to send the beam index to the outboard AEC. The beamformed mic signal is a single channel so adding an additional channel is not a significant increase in network bandwidth. Typical audio channels are 24 bits at 48 KHz, and this is significantly more bandwidth than is necessary to communicate beam position information. This process can be used to create echo cancellers for mics like the Sennheiser in-ceiling model, among other types of mics according to aspects of the embodiments.

According to further aspects of the embodiments, another method of encoding the metadata is to use the least significant bits (LSBs) of the audio sample word to encode the metadata. Audio samples on the network are typically 24 bits, but mics typically have less than 96 dB of dynamic range. According to aspects of the embodiments, using 16 to 20 of the most significant bits (MSBs) can be used for the audio PCM data which would leave 8 or 4 bits for metadata. If the 20 MSBs are used for the beamformed audio signal, the 4 LSBs can be used to encode the position information. These 4 bits could be used in various ways and could be combined with additional data from other samples. These 4 bits are below the mic noise floor so they do not have to be removed from the audio signal, but they can be if desired. That is, in the case of a 20 bit data word, the 16 MSBs can be used to encode the audio signal (i.e., the audio beamformer output) and the 4 LSBs can be used to encode the position of the audio beam, or the beamposition information (metadata, or beam index). Encoding, as those of skill in the art can appreciate, means in this case to convert the analog output signal from the mic transducers into a digital representation or digital word of 20 bits. The 4 LSBs of audio data are replaced by 4 bits of metadata, or beamposition information. If 4 bits are used then up to sixteen different beam positions can be formed by the beamformer, and this is described in greater detail below. The amount of audio data that is lost by replaced the 4 LSBs of audio data with metadata is, in most cases, insignificant, and as described above, is typically of such low level that it generally is below the noise level of the mics.

Network streaming protocols are substantially lossless, so any encoding means should be a reliable way to communicate the metadata across the network. If a complete metadata frame fits in a single network packet, then the internet protocol (IP) layer will discard bad packets and no further detection would be required. If multiple packets are necessary to communicate the metadata and missed data is a concern, then additional information can be used to improve the error tolerance. Error detection techniques like checksums, cyclic redundancy check (CRC), among others, can be used to validate the metadata. Data can be discarded on error and the algorithm can assume the last valid data received is still valid until new valid data arrives. More advanced techniques such as forward error correction (FEC) can also be used to recover lost data.

According to aspects of the embodiments, the information represented by the metadata can represent different types of data. For example, the encoded metadata can represent the beam position number, an angle indicator, and angle plus radius coordinate, or an XY coordinate, among other types of data. According to further aspects of the embodiments, certain aspects of the use of the metadata can be optimized depending on what the index represents (angle, position number, etc., as discussed above). By way of non-limiting example, if the index was an angle indicator, less sets of coefficients can be used and shared for adjacent angles.

Figure 9:
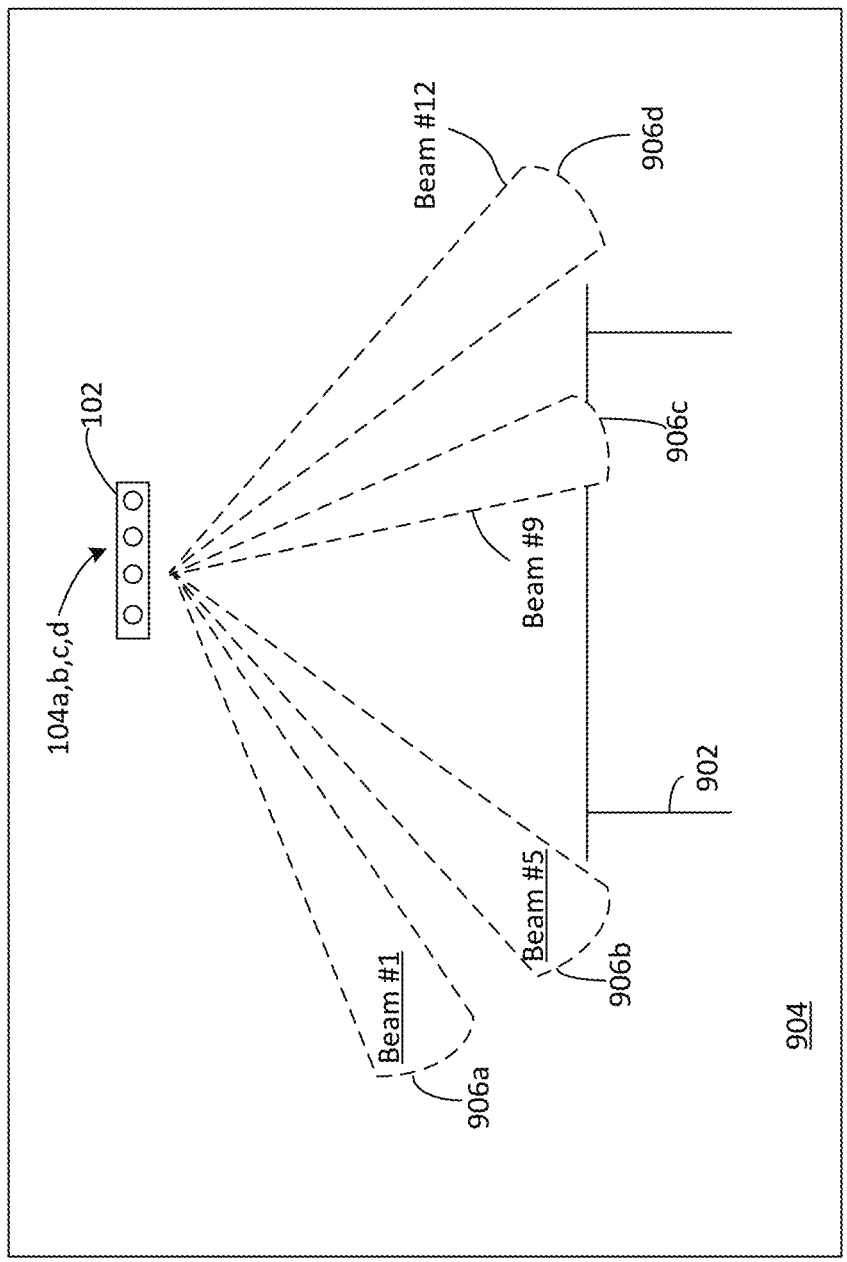
FIG. 9 illustrates a front view of a room in which an adaptive audio beamforming and acoustic echo cancellation conference system are installed, and a plurality of audio beams are shown according to aspects of the embodiments.
Figure 10:
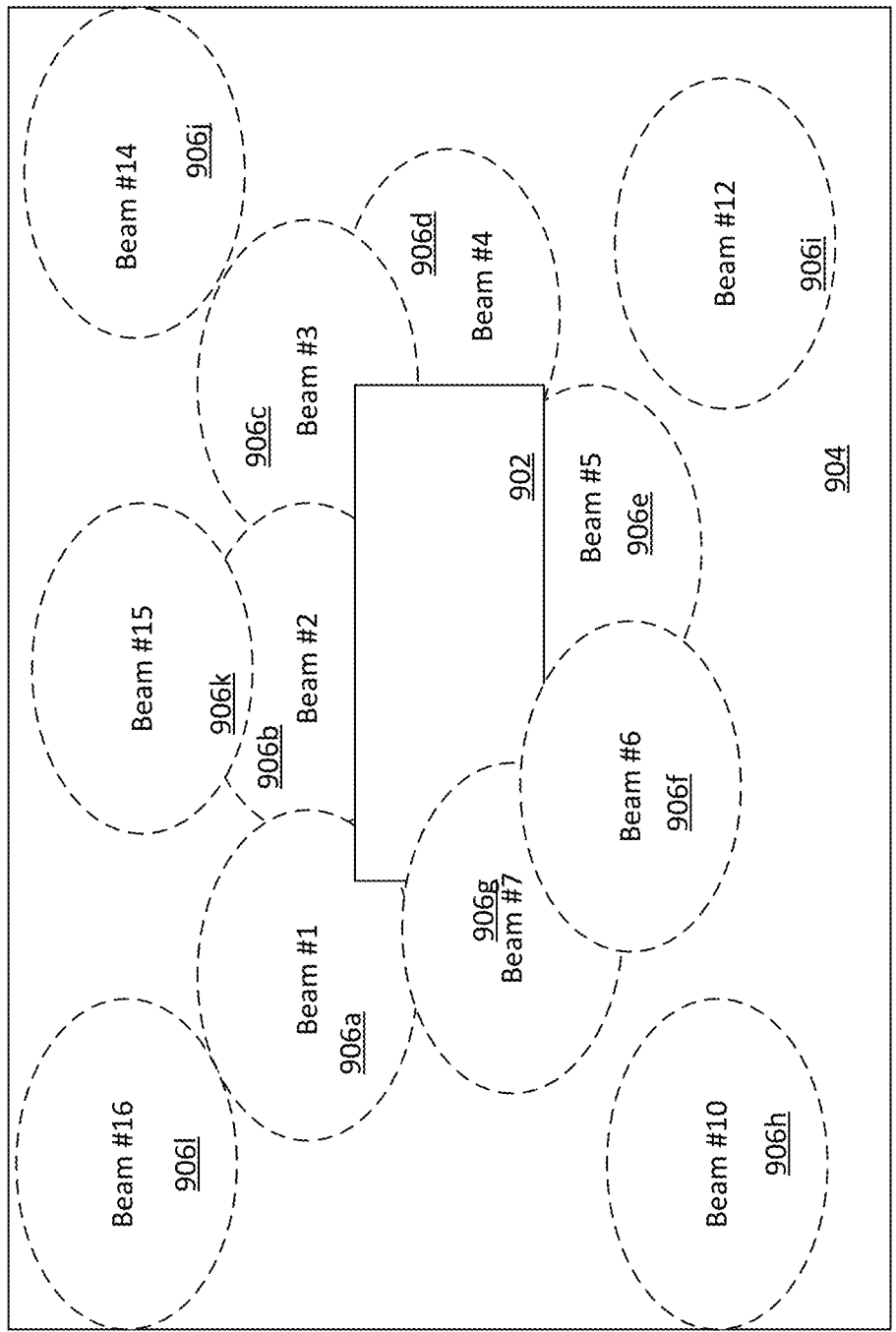
FIG. 10 illustrates a top view of the room of FIG. 9 and wherein a plurality of audio beams are shown according to aspects of the embodiments.

According to aspects of the embodiments, an AEC can adapt to the metadata in various ways. According to an aspect of the embodiments, a first embodiment can be to implement a separate instance of an AEC algorithm running in parallel, one for each different beam position (an "AEC instance," therefore, is an AEC processing circuit (or AEC filter), typically a DSP, adapted to process digitized audio data from one or more mics and output AEC data). The metadata can be used to select which AEC filter output to use; that is, the metadata can be used as an index. Separate filter coefficients can be stored for each beam index. By way of non-limiting example, if there were sixteen different beam positions (e.g., using the 4 LSBs provides up to sixteen different positions), then the index ranges from 0 (0000 binary) to 15 (1111 binary), and an array, or some other type of memory storage device, can store the coefficients for each index. Attention is directed to FIGS. 8-10. In FIG. 8, there is shown the sixteen digital binary values of a beam index with four bits: the beam index ranges from 0000 to 1111 (a numerical value of "0" to "15" (16 beamforming positions)). FIGS. 9 and 10 illustrate examples of how such fixed beam positions might look or appear in a room if they could be seen (which, as those of skill in the art can appreciate, they cannot). Each of audio beam pickup patterns 906a-d are three dimensional and are also generally conically shaped, spreading out as the distance increases from the mic location (shown as mics 104 in FIG. 9, within network mic array 102). Also shown in FIG. 9 is conference table 902 within conference room 904. FIG. 10 illustrates a view from above conference table 902 and mics 104 could be located directly and centrally above table 902, though that need not necessarily be the case. FIG. 10 illustrates that there can be 16 beams, although not all 16 beams are shown in FIG. 10. As discussed in greater detail below, each of these 16 beam locations are fixed: what is not fixed, however, is which beam is active at any given time. That will be determined on a substantially continuous basis by the beamforming device, which used one or more algorithms to determine which beam produces the greatest output and therefore should be the active beam. The beamformer then generates the audio beam (audio output signal) and the beam index that encodes which beam is being used, and transmits that information, according to aspects of the embodiments, in a single audio data word, or, according to further aspects of the embodiments, in two different transmissions.

According to aspects of the embodiments, implementing two or more beam indexes with different or separate filter coefficients allows for a substantially instantaneous selection of an AEC processed signal adapted for that position. The transition from one AEC filter to the next can be slewed so that there are no or substantially no audio discontinuities that can result in clicks or pops. The transition can be coordinated with the beamforming if the beamformer can slew between two beam positions at the same rate that the AEC controls a mixer to transition between two AEC instances.

According to aspects of the embodiments, AEC filters for each position can adapt only when that position is active during far end single talk. The far end (FE) signal is required to adapt the AEC filters to help convergence. AEC filters freeze when the FE beam position is not active, during silence, or during intervals of double talk.

As those of skill in the art can appreciate, AEC circuits were historically very expensive. However, it is further known by those of skill in the art that DSP performance typically increases every year, and the cost per million integer operations per second (MIPS) decreases. For example, a currently available single Sharc 21489 DSP processor can process up to 8 AEC channels operating at 48 KHz with a 200 millisecond (msec) tail length. A single DSP can be used with a beamforming mic array that adapts to 8 different locations. If additional beam positions are desired to improve the localization of the desired audio signal, more DSPs can be used, or the processing of the audio data could be done at a lower sample rate. If multiple DSPs are used, then the signals are combined using a DSP and a combining algorithm such as a selector or mixer. Such combining technology can be done in one of the DSPs performing some of the AEC calculations, or the combining can occur in a separate DSP. Other processors such as the advanced reduced instruction set computer (RISC) machines (ARM) family can have multiple cores, single instructor, multiple data (SIMD) and floating-point accelerators that lend themselves to running multiple instances of an AEC algorithm.

According to further aspects of the embodiments, a further approach is to implement a first AEC instance, but have separate AEC filter coefficients stored in memory for each beamforming position. The separate AEC filter coefficients can be swapped out as the beam position changes. The AEC filter coefficients will only adapt (i.e., be loaded into its respective AEC filter) when that beam position is active. According to further aspects of the embodiments, another adaption of this approach is to implement only two AEC filters, and the system switches between them based on beam position (relayed via the beam index, according to an aspect of the embodiments). A first AEC filter can be used as the active AEC filter, and the second AEC filter can be used to perform the AEC filter coefficient switching. Thus, when it is appropriate to switch between a first beam position and a second beam position, the first AEC filter, with its respective AEC filter coefficients will be processing the audio signal and the second AEC filter will be loaded with upcoming AEC filter coefficients according to a received beam index. Once the second AEC filter has been loaded with the new AEC filter coefficients, then a mixer/fader can slew between the two AEC filters until the AEC with the new active beam coefficients is active.

According to further aspects of the embodiments, another technique that can be implemented can be referred to as adaption. In adaption, the mic can be configured to ignore sound coming from the direction of the speakers. This could be used to determine if there are near end and/or far end voices. If there is no sound from within the area designated for near end voices, the beamformer can cycle through different beam positions while only the far end is speaking to allow the AEC filter to adapt. The cycling between different beam positions would be substantially inaudible to both sides. According to aspects of the embodiments, AEC filter adaption is the process of tuning the AEC filters to optimize the removal of the undesired signal from the mic. The undesired signal is the signal that originates at the far end (e.g., a distant location) playing through the speakers. As people and furniture move, the echo paths can change.

Aspects of the embodiments do not alter the beamforming behavior based on AEC filter status. The process according to aspects of the embodiments, comprises, among other steps, a one-way transfer that includes audio data plus metadata from a single beam position at a time.

An optional optimization of the aspects of the embodiments is to use an additional audio plus metadata channel. As those of skill in the art can appreciate, often a beamforming mic array calculates multiple beam positions simultaneously and selects the best one to output. If this is the case, then according to aspects of the embodiments, the state of all beam coefficients can be improved in the background. Since only one beam is active at a time, the coefficients for the other beams are not adapting to changes in the room acoustics, such as people entering or leaving the room, moving chairs, among other noise generating activities. The beamforming mic array can add a second audio channel to the network stream to send the other inactive beams and cycle through them one at a time at a rate slow enough for AEC adaption. This additional audio signal can also have the embedded metadata that indicates the beam selection. According to aspects of the embodiments, in one non-limiting example, this channel is not intended to be listened to and should only be used for AEC adaption. According to further aspects of the embodiments, an additional AEC instance similar to the primary AEC instance can operate on these cycled audio beam positions so that all beams will refine their AEC filters and be converged when they become the active beam. According to further aspects of the embodiments this optimization beam can also be used to optimize other parameters related to beam position such as noise reduction settings. There can be instances, for example, where different beam positions pick up more or less noise, e.g., the beam points towards or near HVAC vent, or other noise sources. According to further aspects of the embodiments it should be noted that this method also requires substantially no interaction between the AEC processor and beamforming mic array other than the one-way communication of two audio signals and associated metadata. According to further aspects of the embodiments, more than two signals can be sent to improve the filter adaption interval. Sending more than two signals allows multiple zones to adapt in the background in parallel. According to further aspects of the embodiments, however, additional network audio bandwidth and more computational requirements is required for additional AEC instances.

According to aspects of the embodiments to substantially eliminate any artifacts related to changing AEC parameters, noise reduction changes, and residual echo, a small amount of comfort noise can be mixed with the final signal prior to transmission. Comfort noise can also be applied during beam movement to mask associated convergence artifacts. As those of skill in the art can appreciate, comfort noise (or a comfort tone) is synthetic background noise used in radio and wireless communications to fill the artificial silence in a transmission resulting from voice activity detection or from the audio clarity of modern digital lines.

Aspects of the embodiments can be extended to support multiple mic arrays or mic arrays that produce more than one active signal. To support such embodiments, there needs to be enough AEC instances or coefficients to process the number of beamformed mic signals multiplied by the number of beam positions for each mic signal. For example, if there were two mic arrays that each had 8 beam positions, then 16 AEC instances would be required. According to aspects of the embodiments each mic signal produces an echo cancelled mic signal, and then these can be combined with conventional mic combining techniques such as selection, manual mixing, or auto mixing.

FIG. 1 illustrates a block diagram of an audio processing device (APD) 100 that employs adaptive beamforming using beamforming metadata for use in acoustic echo cancellation according to aspects of the embodiments.

APD 100 comprises network mic array 102, which can be a power over Ethernet (POE) powered device with a multitude of mic elements (mics) 104. The outputs of each of mics 104 are directed to adaptive beamformer 106, which can typically be embodied as a DSP adapted to perform adaptive beamforming. The physical output of network mic array 102 can be transmitted over a network interface that has a Dante single channel flow, and which carries combined audio and beam position data signal 107 that, in this particular non-limiting embodiments, contains a 20 bit beamformed audio signal plus a 4 bit beam position metadata portion (beam index). The 20 bit beamformed audio signal can, according to aspects of the embodiments, comprise the 20 MSBs and the audio beamforming metadata can comprise the 4 LSBs according to aspects of the embodiments. The number of bits assigned to the data and metadata is not to be construed in a limiting manner but is one embodiment out of many possible such embodiments.

The output of network mic array 102, combined audio and beam position data signal 107, is received by network audio DSP (NA-DSP) 108. NA-DSP 108 receives the single channel mic+metadata signal from network mic array 102 (combined audio and beam position data signal 107). NA-DSP 108 comprises Dante receiver 110 (although other types of receivers can also be used, including wired and wireless transmitter/receiver pairs), a plurality of AEC filter 112a-n (each of which represents an "instance of AEC processing") the outputs of which, AEC outputs 113a-n, are directed to mixer/selector (mixer) 116. NA-DSP 108 further comprises AEC controller 114, and mixer controller 118 according to aspects of the embodiments. NA-DSP 108 outputs near end voice signal 117 that contains the signal to transmit by audio conference computer 120. The phrase "near end" refers to the end at which mics 104 and beamforming take place, and the "far end" is the source of voice data that communicates with the near end person or people, and is typically spatially relatively far away from the near end. Audio conference computer 120 receives far end voice signal 121 and outputs it to NA-DSP 108. NA-DSP 108 then performs a multitude of AEC instances (or processing) on the received beamformed audio signal (part of signal 107) taking into account the far end signal, where each instance is associated with a different position of the beam which is designated by beamforming metadata information (beam index). According to aspects of the embodiments, AEC filter adaption (or processing) is either frozen or active based on logic derived from the detection of an active signal on the mic beam, the presence of a far end voice signal, and metadata indicating which beam is active. According to aspects of the embodiments, generally one AEC filter 112 is active, as selected by AEC controller 114 by the beam index, and the beam index also selects the output of that AEC filter 112 to be output by mixer 116 to audio conference computer 120 and then sent to the far end. As those of skill in the art can appreciate, audio conference computer 120 can be a laptop, server, or other type of dedicated or non-dedicated processor/computer that includes memory for storing applications and/or software to implement network communications that includes the audio signals.

As discussed above, APD 100 further comprises audio conference computer 120, which can be a stand-alone separate device or incorporated into NA-DSP 108; in addition, NA-DSP 108 can be incorporated into audio conference computer 120, with adaptive beamformer 106 as well. By way of non-limiting example, audio conference computer 120 can be a laptop running Skype®, among other teleconferencing software applications, and can comprise software module/application/program (App) 126, as described in greater detail below. According to still further aspects of the embodiments, the functionality of each of devices 102 and 108 and App 126 can be installed within an ordinary laptop, desktop, cell phone, tablet, personal digital assistant (PDA) among other types of computers to perform the adaptive beamforming, acoustic echo cancellation and network interfacing.

As described briefly above, data for use with APD 100 can be organized as 24-bit audio (digital audio output word 111), which can then be divided into 20 MSBs for the audio data, and 4 beam position metadata bits in the LSB positions. Once the audio data and metadata reach NA-DSP 108, the digital signal is split so the 20 MSBs 111a enter the AEC filters 112a-n, and the 4 metadata LSBs 111b are used to configure the AEC path according to aspects of the embodiments (i.e., received by AEC controller 114 and mixer controller 118). According to aspects of the embodiments, network mic array 102 can be configured to only adapt to 16 discrete beam positions and the 4 bits of metadata will indicate which position the beam is pointed to. According to aspects of the embodiments, mixer 116 shown in FIG. 1 is used as a fader, or panner, to switch between two different AEC instances without creating artifacts. That is, a first AEC filter 112 is faded down while a second AEC filter 112 is raised up (wherein fading/raising describes decreasing/increasing signal levels in a controlled manner). This occurs every time the metadata changes since that triggers the need to make new AEC filters 112 active. According to aspects of the embodiments, a separate AEC filtering/processing instance occurs for each beam position, and involves the process of fading a first AEC filter 112a output while raising a second AEC filter 112b output up, such that the second AEC filter 112 becomes the new AEC instance in use. As those of skill in the art can appreciate, device shown in FIG. 1 can also be referred to as a mixer.

Also shown in FIG. 1 are processors 124a-c, Apps 126a-c, as well as network 122. Apps 126a-c are stored in memory associated with processors 124a-c, although not shown in the drawing Figures. Processors 124a-c and network 122 are described in greater detail below in regard to FIGS. 11 and 12, respectively. As those of skill in the art can now appreciate, each of adaptive beamformer 106, NA-DSP 108 and computer 120 comprise processing devices and associated software. According to aspects of the embodiments, devices 106, 108, 120 each comprise one or more processors 124a,b,c and Apps 126a,b,c; in regard to App 126, this can be embodied as a single, larger App, or can be implemented as separate modules or Apps 126a,b,c in each of 102, 106, and 120, respectively (as is shown in FIG. 1). In adaptive beamformer 106, App 126a and processor 124a perform the beamforming process on the received digital audio signals; in NA-DSP 108 App 126b and processor 124b perform the acoustic echo cancellation processing on the beamformed audio signals, and in audio conference computer 120, processor 124c and App 126c perform the network interface processing. As those of skill in the art can further appreciate, the beamforming, acoustic echo cancellation and network communications functions can all be performed by the separate devices as shown as well as by a single device, with one or more Apps 126a,b,c. That is, substantially all of the processing can be performed in a single processing device, such as a laptop computer, desktop computer, cell-phone, tablet, among other types of processing devices (e.g., 106,

108, and 120 can all be one device, such as a laptop, or cell phone, with App 126 performing the processing as described herein).

While some embodiments will be described in the general context of program modules that execute in conjunction with an application program that runs on an operating system on a personal computer, or other processing devices, those skilled in the art will recognize that aspects may also be implemented in combination with other program modules.

Generally, program modules include routines, programs, components, data structures, and other types of structures that perform particular tasks or implement particular abstract data types. Moreover, those of skill in the art can appreciate that different aspects of the embodiments can be practiced with other computer system configurations, including hand-held devices, multiprocessor systems, microprocessor-based or programmable consumer electronics, minicomputers, mainframe computers, and comparable computing devices. Aspects of the embodiments can also be practiced in distributed computing environments where tasks are performed by remote processing devices that are linked through a communications network. In a distributed computing environment, program modules can be located in both local and remote memory storage devices.

Aspects of the embodiments can be implemented as a computer-implemented process (method), a computing system, or as an article of manufacture, such as a computer program product or computer readable media. The computer program product can be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" can be a combination of software and hardware components for processing audio signals for beamforming and acoustic echo cancellation according to aspects of the embodiments. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory can be a removable or non-removable component of a computing device configured to store one or more instructions to be executed by one or more processors. A processor can be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience can be embodied as a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) can be a set of routines, protocols, and tools for an application or service that allow the application or service to interact or communicate with one or more other applications and services managed by separate entities.

Aspects of the embodiments address a need that arises from very large scale of operations created by networked computing and cloud-based services that cannot be managed by humans. The actions/operations described herein are not a mere use of a computer, but address results of a system that is a direct consequence of software used as a service such as communication services offered in conjunction with communications.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art can appreciate that aspects of the embodiments can be practiced with other computer system configurations, including hand-held devices, multiprocessor systems, microprocessor-based or programmable consumer electronics, minicomputers, mainframe computers, and comparable computing devices. Aspects of the embodiments can also be practiced in distributed computing environments where tasks are performed by remote processing devices that are linked through a communications network. In a distributed computing environment, program modules can be located in both local and remote memory storage devices.

Some aspects of the embodiments can be implemented as a computer-implemented process (method), a computing system, or as an article of manufacture, such as a computer program product or computer readable media. The computer program product can be a computer storage medium readable by a computer system and encoding a computer program that comprises instructions for causing a computer or computing system to perform example process(es). The computer-readable storage medium is a computer-readable memory device. The computer-readable storage medium can, for example, be implemented via one or more of a volatile computer memory, a non-volatile memory, a hard drive, a flash drive, a floppy disk, or a compact disk, and comparable hardware media, among other types of storage media.

A computing device, as used herein, refers to a device comprising at least a memory and one or more processors that includes a server, a desktop computer, a laptop computer, a tablet computer, a smart phone, a vehicle mount computer, or a wearable computer. A memory can be a removable or non-removable component of a computing device adapted to store one or more instructions to be executed by one or more processors. A processor can be a component of a computing device coupled to a memory and adapted to execute programs in conjunction with instructions stored by the memory. Actions or operations described herein can be executed on a single processor, on multiple processors (in a single machine or distributed over multiple machines), or on one or more cores of a multi-core processor. An operating system can be a system adapted to manage hardware and software components of a computing device that provides common services and applications. An integrated module can be a component of an application or service that can be integrated within the application or service such that the application or service can be adapted to execute the component. A computer-readable memory device can be a physical computer-readable storage medium implemented via one or more of a volatile computer memory, a non-volatile memory, a hard drive, a flash drive, a floppy disk, or a compact disk, and comparable hardware media that includes instructions thereon to substantially automatically save content to a location. A user experience can be a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input, among other types of inputs. An API can be a set of routines, protocols, and tools for an application or service that allow the application or service to interact or communicate with one or more other applications and services managed by separate entities.

Figure 2:
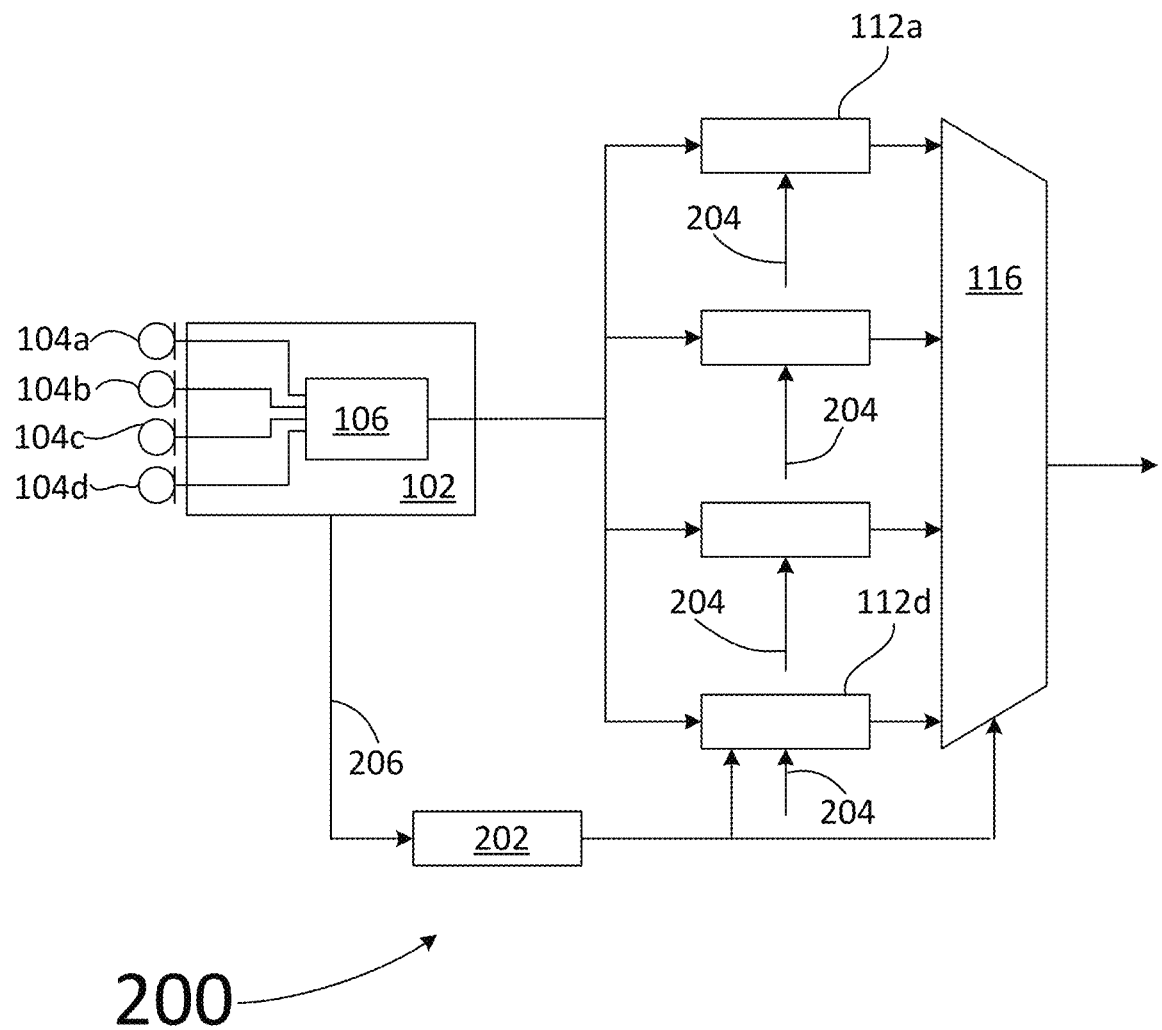
FIG. 2 is a block diagram of a circuit that illustrates beamforming with one audio beam output according to aspects of the embodiments.

FIG. 2 is a block diagram of beamforming circuit with a single output (beamforming circuit) 200 that illustrates beamforming with one beam output according to aspects of the embodiments.

In the circuit of FIG. 2, a beam is formed by adaptive beamformer 106 by tracking an active speaker in a certain direction. A predetermined and stored beam position beam index that is closest to the actual location of the active speaker signal is retrieved; the newly generated audio beam signal is applied to a bank of AEC filters 112a-d; according to aspects of the embodiments, there is a one-to-one correspondence between the number of mics 104 (in this non-limiting case, 4) and the number of AEC filters 112a-d. The beam index that is generated that most closely corresponds to the beam formed by adaptive beamformer 106 is sent to selector output logic circuitry (control logic) 202 to identify which beam direction is active. The beam index selects one of the AEC filters 112a-d that is dedicated to that particular beam direction and allows it to adapt. Separate AEC filters 112 cancel the echoes from the particular beam position assigned to it, and has only to adapt to echo paths in that direction. Each EAC filter 112a-d also receives AEC reference signal 204, which is the far end audio signal and obtained through a network interface, not shown. There is no need for an AEC filter 112 to readapt every time the beam direction changes. However, as those of skill in the art can appreciate, the use of multiple AEC filters 112 results in high computational complexity.

Figure 3:
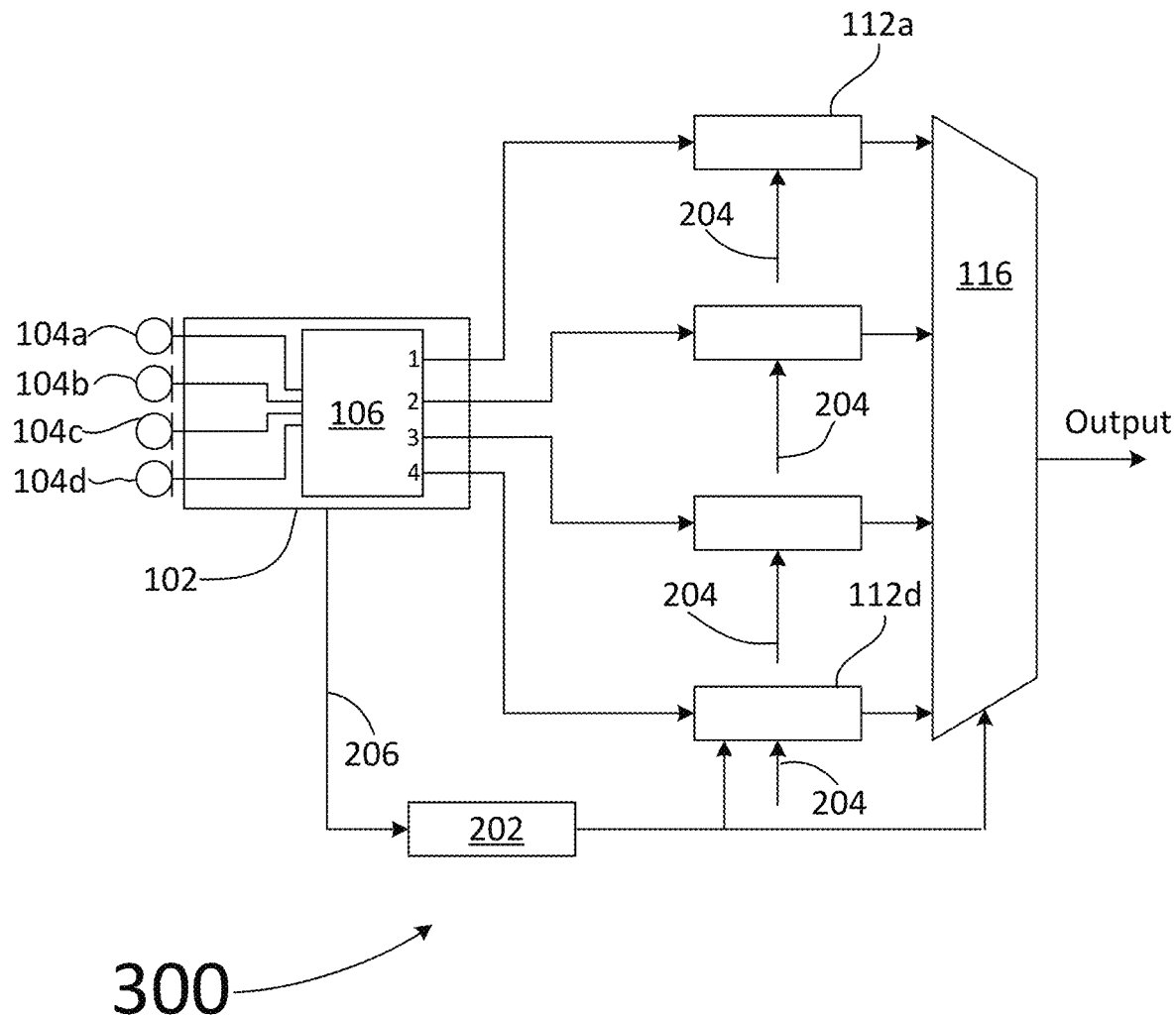
FIG. 3 is a block diagram of a circuit that illustrates beamforming with multiple audio beam outputs according to aspects of the embodiments.

FIG. 3 is a block diagram of beamforming circuit with multiple outputs (beamforming circuit) 300 that illustrates beamforming with one beam output according to aspects of the embodiments.

In beamforming circuit 300 shown FIG. 3, adaptive beamformer 106 computes a separate output for every beam angle allowed. Each AEC filter 112a-d serves a particular fixed beam angle so there is no need to re-converge whenever a new beam is selected. As in beamforming circuit 200 of FIG. 2, a beam index is provided by adaptive beamformer 106 and is used to select the active beam's AEC filter 112 output as well as to allow only that AEC filter 112 to adapt. There is no need to re-converge the AEC filter 112 as beams are changed. Convergence, as those of skill in the art can appreciate, is the process of applying an adaptive filter (or another similar filter function) to the reference signal from the far end to make it match the far end signal at the near end, so that it can be subtracted as much as possible. However, as those of skill in the art can appreciate, the use of multiple AEC filters 112a-d results in high computational complexity.

Figure 4:
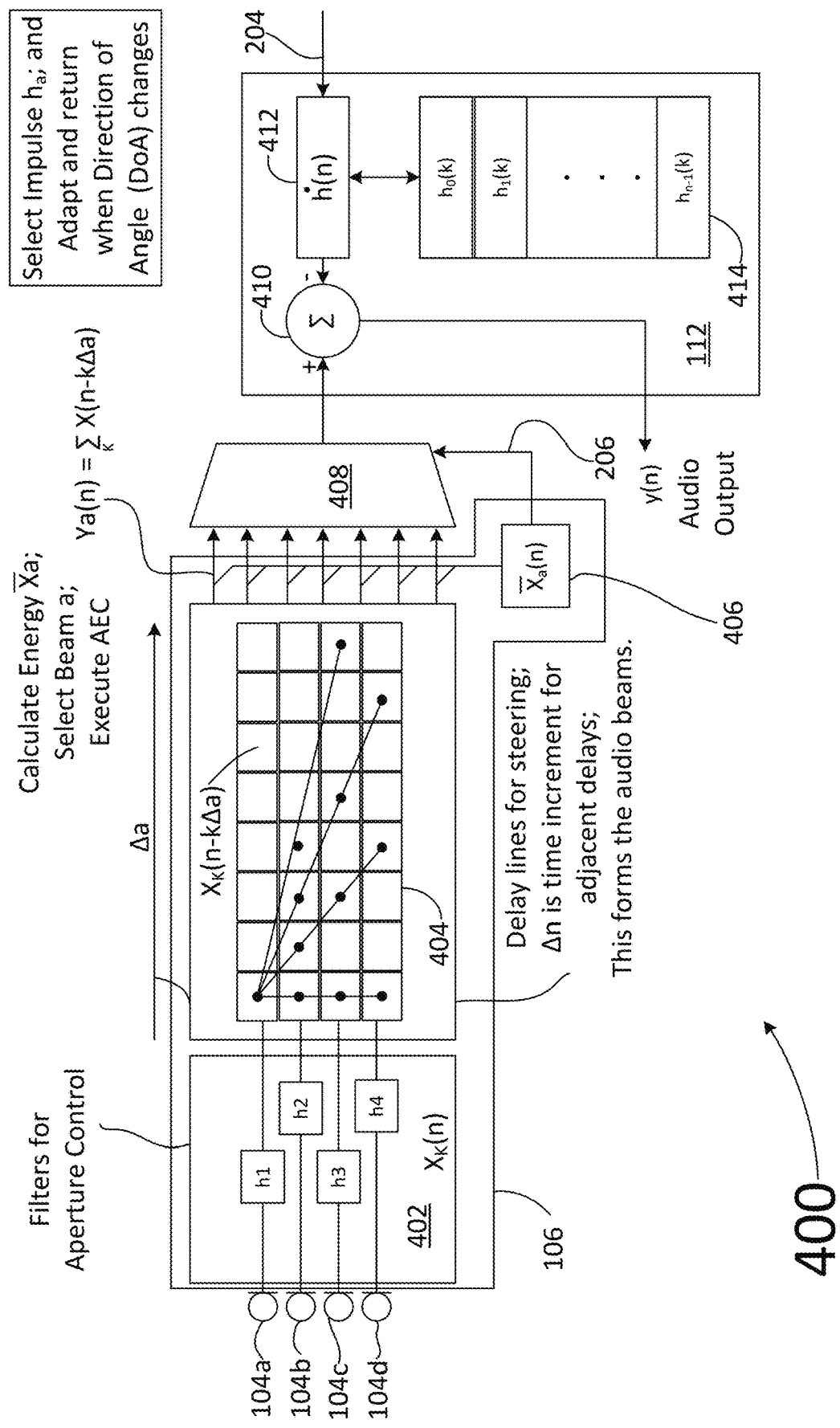
FIG. 4 is a block diagram of a circuit that illustrates beamforming with a single acoustic echo cancellation device and a coefficient library according to aspects of the embodiments.

FIG. 4 is a block diagram of beamforming circuit with a single acoustic echo cancellation device and coefficient library (beamforming circuit) 400 that performs beamforming with a single AEC filter 112 and a coefficient library according to aspects of the embodiments.

Beamforming circuit 400 of FIG. 4 uses a single AEC filter 112 following adaptive beamformer 106 and is thus more computationally efficient than beamforming circuits 200, 200 of FIGS. 2 and 3, respectively. As in beamforming circuits 200, 300 all beams are substantially continuously computed and fixed. Beamforming circuit 400 comprises mics 104a-d, adaptive beamformer 106, and AEC circuit 112. Adaptive beamformer 106 generates beam index signal 206, as in the beamforming circuits 200, 300 of FIGS. 2 and 3, respectively. Adaptive beamformer 106 comprises a plurality of beamformer aperture control filters 402, beamformer delay elements 404, beamformer and control logic 406. Beamforming circuit 400 further comprises beamformer selector 408 (which receives as inputs the four different beams and beam index signal 206 is used to control beamformer selector 408 as to which beam to output). In addition, there is additional circuitry that determines a magnitude of the beams so that the greatest magnitude can be selected to be output. Adaptive beamformer 106 forms a plurality of beams (in this case, 4, thought that need not necessarily need be the case) and outputs the beam that has the highest mean energy. Beamforming circuit 400 also selects a set of associated AEC FIR filter coefficients 414 for AEC finite impulse response (FIR) filters 412 that corresponds to that beam angle. The AEC FIR filter coefficients 414 are selected based on the direction of angle of the beam (which is described within beam index signal 206); that is, a first direction of angle of the first beam will necessitate a first set of impulse filter coefficients, a second direction of angle of the second beam will necessitate a second set of impulse filter coefficients, and so on. Once the proper AEC FIR filter coefficients 414 have been selected based on the direction of angle of the selected beam, the AEC FIR filter coefficients 414 are then loaded into AEC circuit 112 and it continues to adapt for as long as that beam angle is the active one. The output of AEC FIR filter 412 is input to AEC summation circuit (−) along with the output of beamformer selector 408 (+), and summed to form the audio beam signal output, y(n). When the beam changes, a new, respective set of AEC FIR filter coefficients 414 are loaded into AEC circuit 112 that corresponds to the new beam angle. Thus, according to aspects of the embodiments, each beam angle has its set of coefficients. According to further aspects of the embodiment, substantially little or no time for re-convergence is needed as beams and the AEC FIR filter coefficients 414 change.

Figure 5:
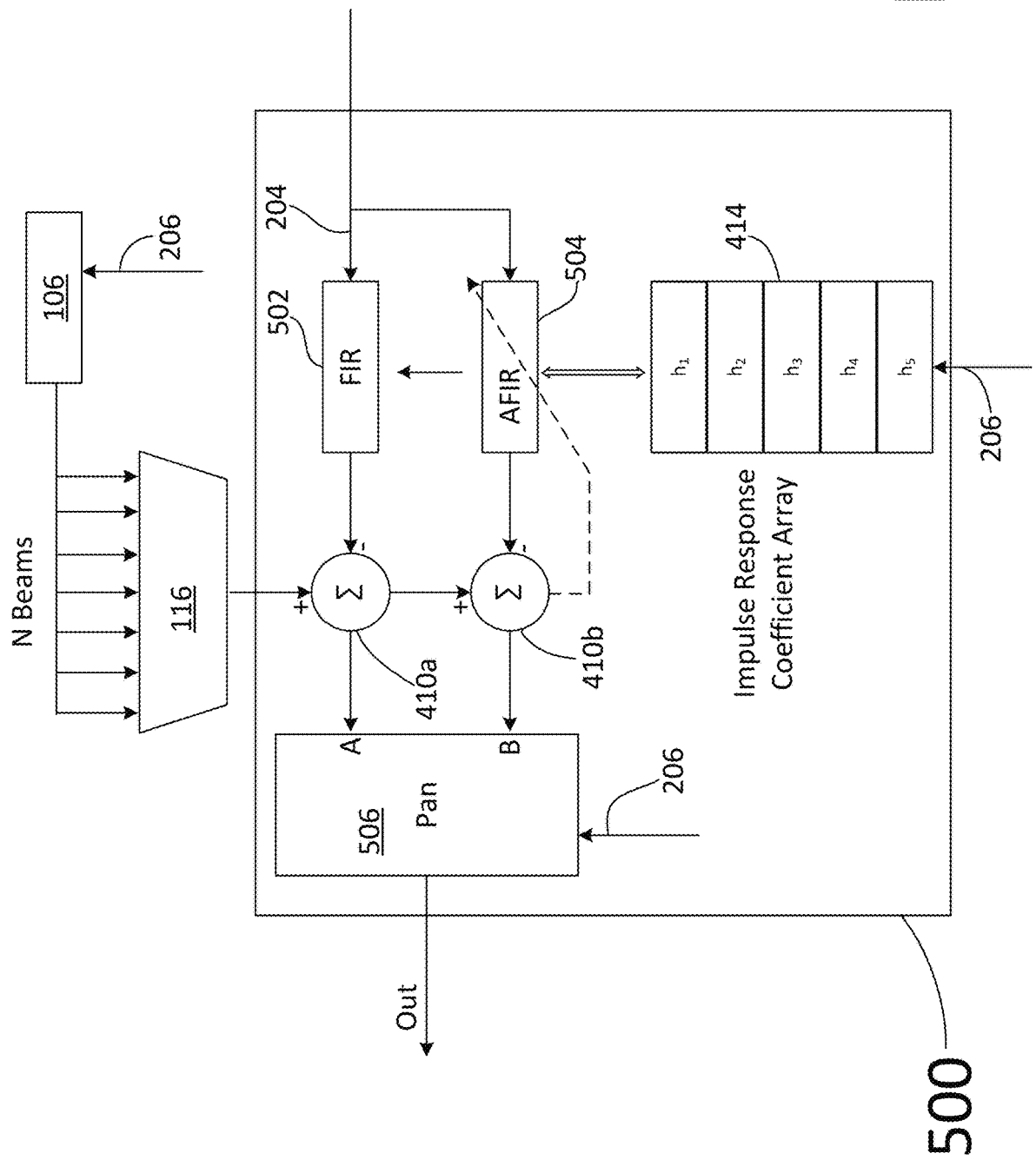
FIG. 5 is a block diagram of a circuit that illustrates beamforming using smoothly switched coefficients according to aspects of the embodiments.

FIG. 5 is a block diagram of smoothly switching AEC filter coefficients circuit (AEC filter) 500 that can be used to perform beamforming using smoothly switched coefficients according to aspects of the embodiments.

In beamforming circuit 400 of FIG. 4, described above, the switching in and out of AEC coefficients can cause artifacts. In AEC filter circuit 500 the generation of artifacts is substantially if not completely avoided by implementing fixed FIR filter 502 and adaptive FIR filter 504 according to aspects of the embodiments. Upon startup, fixed FIR filter 502 is selected to output the beam, and a preselected set of AEC FIR filter coefficients are loaded into fixed FIR filter 502. Fixed FIR filter 502 generates the output and uses the converged confidents for that beam angle. When a new beam angle is selected (which generally will be very soon after startup, or as soon as people enter the area), a new library set of coefficients is selected based on the beam angle (which is transmitted via beam index signal 206) and is subsequently loaded into adaptive FIR filter 504. At substantially the same time, the output from panning circuit 506 is then panned over to be the output of adaptive FIR filter 504 (because panning circuit 506 also receives beam index signal 206 substantially simultaneously) and adaptive FIR filter 504 continues to adapt. Fixed filter 502 coefficients are copied back to the library for use next time. In a relatively short period of time adaptive FIR filter 504 converges, and then the FIR filter coefficients from adaptive FIR filter 504 are copied over to fixed FIR filter 502 and panning circuit 506 is instructed to pan its output from adaptive FIR filter 504 (input B) to fixed FIR filter 502 (input A) to be the output of AEC circuit 500.

FIG. 6 illustrates a flow chart of method 600 for performing adaptive bearmforming using mic metadata to coordinate an acoustic echo cancellation process according to aspects of the embodiments. Method 600 begins with method step 602 in which acoustic audio signals are received at two or more mics 104 in network mic array 102. The acoustic audio signals are converted by the transducers in mics 104 to analog signal, and then converted to digital signals for processing by adaptive beamformer 106.

In method step 604, adaptive beamformer 106 performs audio beamforming on the received digital audio signals, and selects one of N beam positions to output as a digital beamformed audio signal, wherein the digital beamformed audio signal comprises an audio portion and a beam index portion, the beam index portion encoding the selected one of N beam positions as a digital number. According to aspects of the embodiments, there are only N beam positions, which correspond to the N acoustic echo cancellation filter circuits, and these are known beforehand, or programmed into the adaptive beamformer 106.

Following method step 604, in method step 606 the digital beamformed signal is received at a receiver that is electrically associated with the echo cancellation filter circuits. As those of skill in the art can now appreciate, it is possible, that all of the circuitry described and discussed herein can be contained within a single box or device; thus the discussion of a "receiver" is non-limiting and not meant to be, nor should be construed, as meaning that the devices must be separated into different units or boxes. That is, the implementation of a receiver conveys that the beam index information is transmitted together with the beamformed audio signal as one word, and in method step 608. In method step 608 the received digital audio word is split apart. In method step 610 the beam index, which is encoded within a first subset of bits of the digital audio transmission (i.e., the first M LSBs (e.g., first 4 LSBs in a 20 bit word)), is extracted from the transmitted digital audio word and sent to the AEC controller 114 and mixer controller 118 according to aspects of the embodiments, and the audio portion, the upper MSBs, is sent to each of the acoustic echo cancellation filter circuits 112a-n.

In method step 612 the audio portion and a far end audio signal are received by each of the AEC filters 112a-n. In method step 614 each of the N acoustic echo cancellation filter circuits performs acoustic echo cancellation on the received audio portion in regard to the far end audio signal and specific filter coefficients stored with the AEC filters for the specific beam position that pertains to the AEC filter 112.

In method step 616, one of the N acoustic echo cancellation circuits' outputs are output from the mixer based on the encoded beam position information (e.g., the "beam index"). That is, mixer controller 118 receives the beam index information (the M LSBs of the transmitted digital audio word) and decodes the same to determine which is the active beam and selects the corresponding AEC filter output that is input to mixer 116.

FIG. 7 illustrates different sets of additional processing steps that can be performed to improve adaptive bearmforming using mic metadata to coordinate an acoustic echo cancellation process according to aspects of the embodiments.

In block 702, a first set of additional processing steps according to aspects of the embodiments comprises: Rejecting a beam radius to avoid the far end (FE) Loudspeaker; Determining a speaker direction during operation by detecting FE single talk; and Identifying the loudest beam signal (alternatively, entering the location (i.e., the azimuth) of the speaker manually during setup and commissioning).

In block 704, a second set of additional processing steps according to aspects of the embodiments comprises: Varying the convergence rate of the AEC and speeding up the convergence rate if the beamformer switches to an angle that has not been used recently thus allowing for faster adaptation on a path change.

In block 706, a third set of additional processing steps according to aspects of the embodiments comprises: Increasing the amount of NLP attenuation can occur during initial convergence after a beam change to mask the adaptation artifacts.

In block 708, a fourth set of additional processing steps according to aspects of the embodiments comprises: Delaying the inputs to the AEC but not the beam index or doubletalk and single talk detectors, such that adaptation or selection of another AEC can start earlier than the need to apply it. The AEC will already be converged when the beam signal is then applied.

In block 710, a fifth set of additional processing steps according to aspects of the embodiments comprises: Initializing the AEC with a 'seed impulse response', such as a single coefficient at the direct echo path time that will increase the speed at which the AEC's adaptive filter can converge. This can be manually set at room setup or calculated at run time using autocorrelation techniques.

In block 712, a sixth set of additional processing steps according to aspects of the embodiments comprises: Moving a separate 'training beam' around during run time to create the library of AEC coefficients for each beam angle. This training beam can also be used to characterize the ambient noise in each direction and to create an array of frequency domain functions for spectral subtraction noise reduction for each angle.

Figure 11:
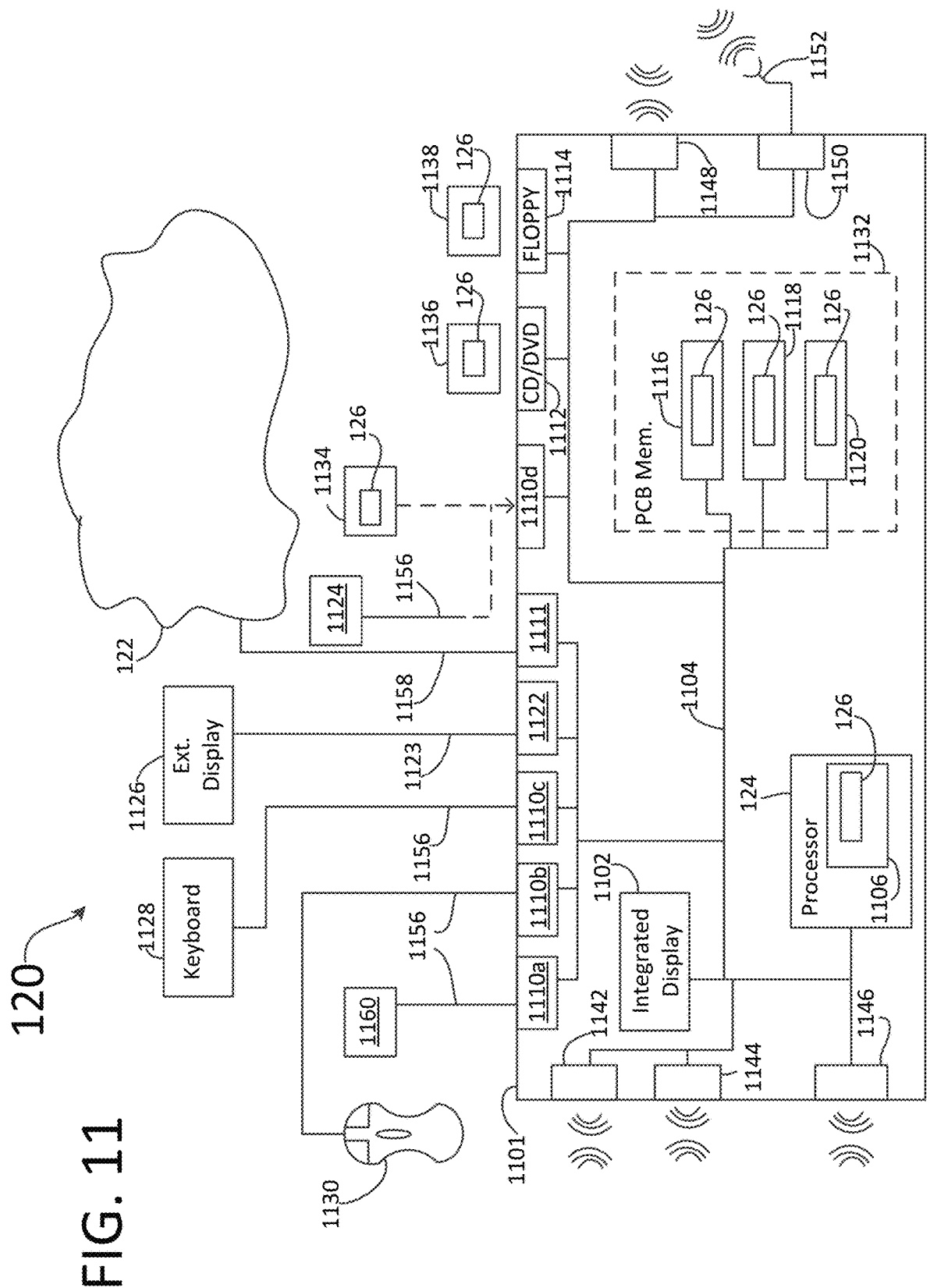
FIG. 11 illustrates a personal computer/processor/laptop suitable for use to implement the method shown in FIG. 6, among other methods, for performing adaptive beamforming using beamforming metadata to coordinate an acoustic echo cancellation process can be implemented according to aspects of the embodiments.

FIG. 11 illustrates a personal computer/processor/laptop suitable for use to implement the method shown in FIG. 6, among other methods, for performing adaptive beamforming using beamforming metadata to coordinate an acoustic echo cancellation process can be implemented according to aspects of the embodiments.

FIG. 11 illustrates a block diagram of audio processing computer 120 (and other types of computers, such as laptops, desktops, tablets, personal digital assistants (PDAs) and the like) suitable for use to implement method 600 for performing adaptive beamforming using beamforming metadata to coordinate an acoustic echo cancellation process according to aspects of the embodiments. Audio conference computer 120 comprises, among other items, shell/box 1101, integrated display/touch-screen (display) 1102 (though not used in every application of audio conference computer 120), internal data/command bus (bus) 1104, processor board/processor internal memory (internal memory) 1132, and one or more processors 124 with processor internal memory 1106 (which can be typically read only memory (ROM) and/or random access memory (RAM)). Those of ordinary skill in the art can appreciate that in modern processor systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. Audio conference computer 120 further comprises multiple input/output ports, such as universal serial bus ports 1110, Ethernet ports 1111, and video graphics array (VGA) ports/high definition multimedia interface (HDMI) ports 1122, among other types. Further, audio conference computer 120 includes externally accessible drives such as compact disk (CD)/digital video disk (DVD) read/write (RW) (CD/DVD/RW) drive 1112, and floppy diskette drive 1114 (though less used currently, many computers still include this device). Audio conference computer 120 still further includes wireless communication apparatus, such as one or more of the following: Wi-Fi transceiver 1142, BlueTooth (BT) transceiver 1144, near field communications (NFC) transceiver 1146, third generation (3G)/fourth Generation (4G)/long term evolution (LTE) (3G/4G/LTE) transceiver 1148, communications satellite/global positioning system (satellite) transceiver device 1150, and antenna 1152.

Internal memory 1132 itself can comprise hard disk drive (HDD) 1116 (these can include conventional magnetic storage media, but, as is becoming increasingly more prevalent, can include flash drive memory 1134, among other types), read-only memory (ROM) 1118 (these can include electrically erasable (EE) programmable ROM (EEPROMs), ultraviolet erasable PROMs (UVPROMs), among other types), and random access memory (RAM) 1120. Usable with USB port 1110 is flash drive memory 1134, and usable with CD/DVD/RW drive 1112 are CD/DVD disks 1136 (which can be both read and write-able). Usable with floppy diskette drive 1114 are floppy diskettes 1138. External memory storage 1124 can be used to store data and programs external to box 1101 of audio conference computer 120, and can itself comprise another HDD 1116a, flash drive memory 1134 (which can also be referred to as "storage media"), among other types of memory storage. External memory storage 1124 is connectable to audio conference computer 120 via USB cable 1156. Each of the memory storage devices, or the memory storage media (1106, 1116, 1118, 1120, 1124, 1134, 1136, and 1138, among others), can contain parts or components, or in its entirety, executable software programming code or application (application, or "App") 126, which can implement part or all of the portions of method 600 described herein.

In addition to the above described components, audio conference computer 120 also comprises keyboard 1128, external display 1126, printer/scanner/fax machine 1160, and mouse 1130 (although not technically part of processor 124, the peripheral components as shown in FIG. 11 (1124, 1126, 1128, 1130, 1134, 1136, 1138, and 1160) are so well known and adapted for use with audio conference computer 120 that for purposes of this discussion they shall be considered as being part of audio conference computer 120). Other cable types that can be used with audio conference computer 120 include RS 232, among others, not shown, that can be used for one or more of the connections between audio conference computer 120 and the peripheral components described herein. Keyboard 1128, mouse 1130, and printer/scanner/fax machine 1160 are connectable to audio conference computer 120 via USB cable 1156 and USB ports 1110, and external display 1126 is connectible to computer 120 via VGA cable/HDMI cable 1123. Audio conference computer 120 is connectible to network 122 (which can be the Internet) via Ethernet port 1111 and Ethernet cable 1158 via a router and modulator-demodulator (MODEM), neither of which are shown in FIG. 11. All of the immediately aforementioned components (1122, 1124, 1126, 1128, 1130, 1134, 1136, 1138, 1156, 1158, and 1160) are known to those of ordinary skill in the art, and this description includes all known and future variants of these types of devices.

External display 1126 can be any type of known display or presentation screen, such as liquid crystal displays (LCDs), light emitting diode displays (LEDs), plasma displays, cathode ray tubes (CRTs), among others. In addition to the user interface mechanism such as mouse 1130, audio conference computer 120 can further include a microphone, touch pad, joy stick, touch screen, voice-recognition system, among other inter-active inter-communicative devices/programs, which can be used to enter data and voice, and which all of are known to those of skill in the art and thus a detailed discussion thereof has been omitted in fulfillment of the dual purposes of clarity and brevity.

As mentioned above, audio conference computer 120 further comprises a plurality of wireless transceiver devices, such as Wi-Fi transceiver 1142, BT transceiver 1144, NFC transceiver 1146, 3G/4G/LTE transceiver 1148, satellite transceiver device 1150, and antenna 1152. While each of Wi-Fi transceiver 1142, BT transceiver 1144, NFC transceiver 1146, 3G/4G/LTE transceiver 1148, and satellite transceiver device 1150 has their own specialized functions, each can also be used for other types of communications, such as accessing a cellular service provider (not shown), accessing the Internet, texting, emailing, among other types communications and data/voice transfers/exchanges, as known to those of skill in the art. Each of Wi-Fi transceiver 1142, BT transceiver 1144, NFC transceiver 1146, 3G/4G/LTE transceiver 1148, satellite transceiver device 1150 includes a transmitting and receiving device, and a specialized antenna, although in some instances, one antenna can be shared by one or more of Wi-Fi transceiver 1142, BT transceiver 1144, NFC transceiver 1146, 3G/4G/LTE transceiver 1148, and satellite transceiver device 1150. Alternatively, one or more of Wi-Fi transceiver 1142, BT transceiver 1144, NFC transceiver 1146, 3G/4G/LTE transceiver 1148, and satellite transceiver device 1150 will have a specialized antenna, such as satellite transceiver device 1150 to which is electrically connected at least one antenna 1152.

In addition, audio conference computer 120 can access network 122, either through a hard-wired connection such as Ethernet port 1111 as described above, or wirelessly via Wi-Fi transceiver 1142, 3G/4G/LTE transceiver 1148 and/or satellite transceiver 1150 (and their respective antennas) according to an embodiment. Audio conference computer 120 can also be part of a larger network configuration as in a global area network (GAN) (e.g., the internet), which ultimately allows connection to various landlines.

According to further embodiments, integrated touch screen display 1102, keyboard 1128, mouse 1130, and external display 1126 (if in the form of a touch screen), can provide a means for a user to enter commands, data, digital, and analog information into audio conference computer 120. Integrated and external displays 1102, 1126 can be used to show visual representations of acquired data, and the status of applications that can be running, among other things.

Bus 1104 provides a data/command pathway for items such as: the transfer and storage of data/commands between audio conference computer 120, Wi-Fi transceiver 1142, BT transceiver 1144, NFC transceiver 1146, 3G/4G/LTE transceiver 1148, satellite transceiver device 1150, integrated display 1102, USB port 1110, Ethernet port 1111, VGA/HDMI port 1122, CD/DVD/RW drive 1112, floppy diskette drive 1114, and internal memory 1132. Through bus 1104, data can be accessed that is stored in internal memory 1132. Audio conference computer 120 can send information for visual display to either or both of integrated and external displays 1102, 1126, and the user can send commands to system operating programs/software/Apps (including App 126) that might reside in processor internal memory 1106 of audio conference computer 120, or any of the other memory devices (1136, 1138, 1116, 1118, and 1120).

Audio conference computer 120 and either processor internal memory 1106 or internal memory 1132, can be used to implement method 600 for performing adaptive beamforming using beamforming metadata to coordinate an acoustic echo cancellation process according to aspects of the embodiments. Hardware, firmware, software or a combination thereof may be used to perform the various steps and operations described herein. According to an embodiment, App 126 for carrying out the above discussed steps can be stored and distributed on multi-media storage devices such as devices 1116, 1118, 1120, 1134, 1136 and/or 1138 (described above) or other form of media capable of portably storing information. Storage media 1134, 1136 and/or 1138 can be inserted into, and read by devices such as USB port 1110, CD/DVD/RW drive 1112, and disk drives 1114, respectively.

As also will be appreciated by one skilled in the art, the various functional aspects of the embodiments may be embodied in a wireless communication device, a telecommunication network, or as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random-access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

Figure 12:
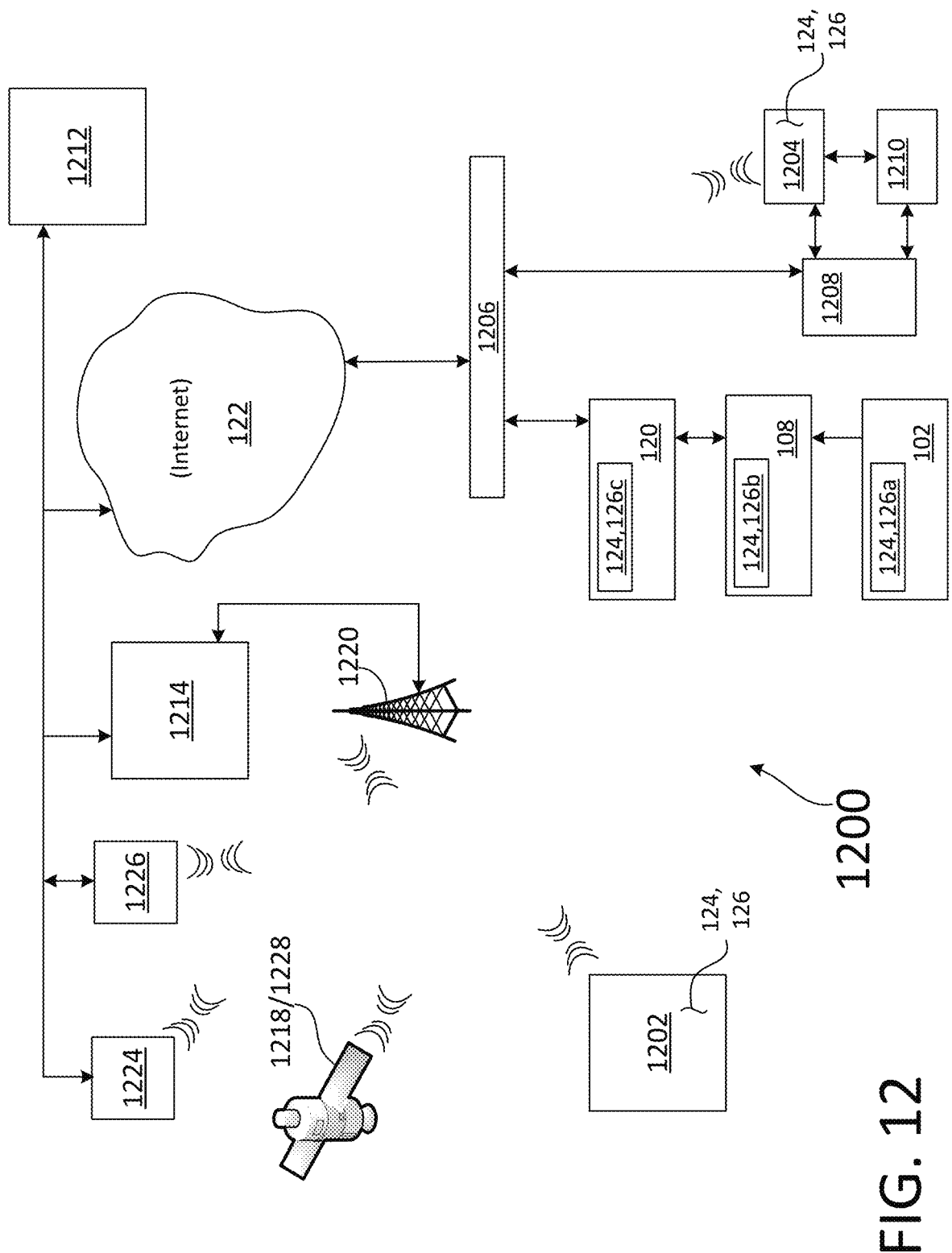
FIG. 12 illustrates a network system within which the system and method shown in FIG. 6, among other methods, for performing adaptive beamforming using beamforming metadata to coordinate an acoustic echo cancellation process can be implemented according to aspects of the embodiments.

FIG. 12 illustrates a network system within which the system and method shown in FIG. 6, among other methods, for performing adaptive beamforming using beamforming metadata to coordinate an acoustic echo cancellation process can be implemented according to aspects of the embodiments. Much of the network system infrastructure shown in FIG. 12 is or should be known to those of skill in the art, so, in fulfillment of the dual purposes of clarity and brevity, a detailed discussion thereof shall be omitted.

According to aspects of the embodiments, a user of the system and method for performing adaptive beamforming using beamforming metadata to coordinate an acoustic echo cancellation process can have App 126 on their mobile device 1202, as well as on a audio conference computer 120, laptop computer, server, tablet device, and/or dedicated devices 102, 108, 120, such as those shown in FIG. 1, and the devices as shown in FIGS. 2-5, according to aspects of the embodiments. Thus, each of devices 1202, 1204, 120, 108, 102, each contain processor 124 and one form or another of App 126 according to aspects of the embodiments. If devices 1202 and/or 1204 were to be used, an additional interface (not shown) would be needed to acquire the audio signal outputs of mics 104 (also not shown in FIG. 12).

Mobile devices 1202 can include, but are not limited to, so-called smart phones, tablets, personal digital assistants, notebook and laptop computers, and essentially any device that can access the internet and/or cellular phone service or can facilitate transfer of the same type of data in either a wired or wireless manner. For purposes of this discussion, the user shall be discussed as using only mobile device 1202, i.e., a smartphone, though such discussion should be understand to be in a non-limiting manner in view of the discussion above about the other types of devices that can access, use, and provide such information.

Mobile device 1202 can access cellular service provider 1214, either through a wireless connection (cellular tower 1220) or via a wireless/wired interconnection (a "Wi-Fi" system that comprises, e.g., modulator/demodulator (modem) 1208, wireless router 1210, personal computer (PC) 1204, internet service provider (ISP) 1206, and network 122). Further, mobile device 1202 can include near field communication (NFC), "Wi-Fi," and Bluetooth (BT) communications capabilities as well, all of which are known to those of skill in the art. To that end, network system 1200 further includes, as many homes (and businesses) do, one or more PCs/servers 1204 that can be connected to wireless router 1210 via a wired connection (e.g., modem 1208) or via a wireless connection (e.g., Bluetooth). Modem 1208 can be connected to ISP 1206 to provide internet-based communications in the appropriate format to end users (e.g., PC 1204), and which takes signals from the end users and forwards them to ISP 1206. Such communication pathways are well known and understand by those of skill in the art, and a further detailed discussion thereof is therefore unnecessary.

Mobile device 1202 can also access global positioning system (GPS) satellite 1228, which is controlled by GPS station 1224, to obtain positioning information (which can be useful for different aspects of the embodiments), or mobile device 1202 can obtain positioning information via cellular service provider 1214 using cell tower(s) 1220 according to one or more well-known methods of position determination. Some mobile devices 1202 can also access communication satellites 1218 and their respective satellite communication systems control stations 1226 (the satellite in FIG. 12 is shown common to both communications and GPS functions) for near-universal communications capabilities, albeit at a much higher cost than convention "terrestrial" cellular services. Mobile device 1202 can also obtain positioning information when near or internal to a building (or arena/stadium) through the use of one or more of NFC/BT devices, the details of which are known to those of skill in the art. FIG. 12 also illustrates other components of network system 1200 such as plain old telephone service (POTS) provider 1212 (though shown to be connected to network 122 (which can be the Internet), connections have been omitted for clarity to devices 120 and 1204).

According to further aspects of the embodiments, network system 1200 also contains audio processing computer 120, wherein one or more processors 124, using known and understood technology, such as memory, data and instruction buses, and other electronic devices, can store and implement code that can implement the system and method 600 (among other methods) for performing adaptive beamforming using beamforming metadata to coordinate an acoustic echo cancellation process according to aspects of the embodiments.

The disclosed embodiments provide several different systems, software products, and methods generally related to audio systems and digital signal processing, and more particularly to systems, methods, and modes for implementing an acoustic echo cancellation device with adaptive beamforming microphones (mic) in a conferencing system wherein beamforming beam position metadata can be shared with, in a first aspect, the acoustic echo cancellation (AEC) filter processor and mixer controls, and in a second aspect, the beamforming beam position metadata can be shared with the AEC, and wherein in both cases, such sharing of beamforming beam position metadata improves the performance of AEC processing. According to aspects of the embodiments, the mixer can be used to eliminate or substantially eliminate AEC filter change artifacts. According to further aspects of the embodiments, AEC filter change artifacts can be eliminated by slewing the AEC adaptive filters over time. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

INDUSTRIAL APPLICABILITY

To solve the aforementioned problems, the aspects of the embodiments are directed towards audio systems, and more specifically to systems, methods, and modes for implementing an acoustic echo cancellation device with adaptive beamforming microphones (mic) in a conferencing system wherein beamforming beam position metadata can be shared with, in a first aspect, the acoustic echo cancellation (AEC) filter processor and mixer controls, and in a second aspect, the beamforming beam position metadata can be shared with the AEC, and wherein in both cases, such sharing of beamforming beam position metadata improves the performance of AEC processing.

ALTERNATE EMBODIMENTS

Alternate embodiments may be devised without departing from the spirit or the scope of the different aspects of the embodiments.

What is claimed is:

1. An audio processing device for use in a network connected audio conferencing system, comprising:
a network microphone array comprising two or more microphones (mics) and a beamforming circuit, wherein the network mic array is adapted to acquire acoustic audio signals, convert the same to electric audio signals, perform audio beamforming on the electric audio signals, and output a digital combined beamforming circuit output signal that comprises a first signal part and a second signal part, and wherein
the first signal part comprises a first set of digital bits that comprises an active beam index, and wherein the active beam index encodes a selected beam position out of a possible N beam positions, and wherein
the second signal part comprises a second set of digital bits that comprises a beamformed audio signal;
a receiver adapted to receive the digital combined beamforming circuit output signal and split the same into the first signal part and the second signal part;
a plurality of acoustic echo cancellation filter devices, each of which are adapted to receive the second signal part and a far end reference audio signal from a far end audio processing device, and perform acoustic echo cancellation on the beamformed audio signal in view of the far end audio signal; and
an AEC filter circuit controller adapted to receive the first signal part, decipher the active beam index encoded in the first beamformed audio signal part to determine which of the N beam positions is active, and select a corresponding one of the plurality of acoustic echo cancellation filter devices based on the active one of N beam positions to generate an output audio signal from the audio processing device to be transmitted to the far end audio processing device.

2. The audio processing device according to claim 1, further comprising:
a mixer adapted to receive each of the outputs of the plurality of acoustic echo cancellation filter devices, output the output of the selected acoustic echo cancellation filter device to be transmitted to the far end audio processing device, and wherein the mixer is further adapted to
transition its output from the output of a previously selected acoustic echo cancellation filter device to an output of a newly selected acoustic echo cancellation filter device to be output from the audio processing device to the far end audio processing device.

3. The audio processing device according to claim 2, wherein
the mixer is adapted to receive the first signal part, decipher the active beam index encoded in the first signal part to determine which of the N beam positions is active, and select the newly selected acoustic echo cancellation filter device that corresponds to the active one of N beam positions.

4. A method for processing audio signals in an audio processing device, the method comprising:
receiving acoustic audio signals at a plurality of microphones (mics) and converting the same to digital audio signals;
performing audio beamforming on the received digital audio signals, and selecting one of N beam positions to output as a digital beamformed audio signal, and wherein the digital beamformed audio signal comprises an audio portion and a beam index portion, the beam index portion encoding the selected one of N beam positions as a digital number;
receiving the digital beamformed audio signal at a receiver;

splitting the digital beamformed audio signal by the receiver into the audio portion and the beam index portion;

forwarding the audio portion to N acoustic echo cancellation filter circuits and forwarding the beam index portion to an AEC controller;

receiving the audio portion and a far end audio signal transmitted from far end audio processing device at each of the N acoustic echo cancellation filter circuits;

performing acoustic echo cancellation at each of the N acoustic echo cancellation devices on the received audio portion in regard to the far end audio signal; and selecting one of the N acoustic echo cancellation circuits outputs as an output of the audio processing device that corresponds to the selected one of N beam positions.

5. The method according to claim 4, further comprising:

receiving each of the outputs of the plurality of acoustic echo cancellation filter devices at a mixer;

outputting, by the mixer, the output of the selected acoustic echo cancellation filter device to be transmitted to the far end audio processing device;

transitioning, by the mixer, its output from the output of a previously selected acoustic echo cancellation filter device to an output of a newly selected acoustic echo cancellation filter device to be output from the audio processing device to the far end audio processing device.

6. The method according to claim 5, further comprising:

receiving at the mixer the beam index portion and deciphering the beam index to determine which of the N beam positions is active; and selecting the newly selected acoustic echo cancellation filter device that corresponds to the active one of N beam positions.

* * * * *